United States Patent
Montagne

(10) Patent No.: US 12,548,842 B2
(45) Date of Patent: Feb. 10, 2026

(54) BATTERY PACK FOR AN ELECTRIC MARINE VESSEL

(71) Applicant: VISION MARINE TECHNOLOGIES, Boisbriand (CA)

(72) Inventor: Xavier Montagne, Laval (CA)

(73) Assignee: VISION MARINE TECHNOLOGIES, Boisbriand (CA)

( * ) Notice: Subject to any disclaimer, the term of this patent is extended or adjusted under 35 U.S.C. 154(b) by 0 days.

(21) Appl. No.: 18/664,377

(22) Filed: May 15, 2024

(65) Prior Publication Data
US 2025/0357602 A1   Nov. 20, 2025

(51) Int. Cl.
| | |
|---|---|
| H01M 50/249 | (2021.01) |
| B60L 50/64 | (2019.01) |
| B60L 58/26 | (2019.01) |
| H01M 10/42 | (2006.01) |
| H01M 10/613 | (2014.01) |
| H01M 50/213 | (2021.01) |

(52) U.S. Cl.
CPC ......... H01M 50/249 (2021.01); B60L 50/64 (2019.02); B60L 58/26 (2019.02); H01M 10/613 (2015.04); H01M 50/213 (2021.01); B60L 2200/32 (2013.01); H01M 2010/4271 (2013.01)

(58) Field of Classification Search
None
See application file for complete search history.

(56) References Cited

U.S. PATENT DOCUMENTS

| | | | |
|---|---|---|---|
| 2015/0010782 A1* | 1/2015 | Tanigaki | H01M 10/63 429/7 |
| 2016/0226112 A1* | 8/2016 | Maskew | B60L 58/12 |
| 2017/0279170 A1 | 9/2017 | O'Hora | |
| 2019/0245369 A1* | 8/2019 | Banos | H02J 7/00308 |

(Continued)

FOREIGN PATENT DOCUMENTS

| | | |
|---|---|---|
| CN | 203057753 U | 7/2013 |
| CN | 213754041 U | 7/2021 |

(Continued)

OTHER PUBLICATIONS

International Search Report and Written Opinion, PCT/CA2025/050661, Jul. 14, 2025, 13 pages.

*Primary Examiner* — Rexford N Barnie
*Assistant Examiner* — Joel Barnett

(57) ABSTRACT

Embodiments for a battery pack for an electric marine vessel are described herein. In a particular embodiment, a battery pack for an electric marine vessel comprises a waterproof chassis, a high voltage battery comprising a plurality of battery cells disposed within the chassis, positive and negative high voltage connectors disposed on a front flange of the chassis, a manual disconnect connector disposed on the front flange of the chassis, and a signals connector disposed on the front flange of the chassis, the signals connector configured for signal communication with at least a power distribution unit and a vessel control unit. A battery management system disposed within the chassis and coupled to the signals connector comprises a battery management controller, a plurality of relays operable by the battery management controller, and a plurality of sensors electrically coupled to the battery management controller.

20 Claims, 17 Drawing Sheets

(56) References Cited

U.S. PATENT DOCUMENTS

| | | | |
|---|---|---|---|
| 2021/0036280 A1* | 2/2021 | Nishimori | H01M 50/264 |
| 2022/0328893 A1 | 10/2022 | Oenick et al. | |
| 2022/0328912 A1 | 10/2022 | Gonring | |
| 2022/0328943 A1* | 10/2022 | Mueller | H01M 10/654 |
| 2023/0150368 A1 | 5/2023 | Mazaika et al. | |
| 2024/0017808 A1 | 1/2024 | Mueller et al. | |
| 2024/0204293 A1* | 6/2024 | Zhang | H01M 50/209 |
| 2024/0351470 A1* | 10/2024 | Hunley | B60L 58/12 |
| 2024/0389246 A1 | 11/2024 | Liu et al. | |

FOREIGN PATENT DOCUMENTS

| | | |
|---|---|---|
| CN | 216650327 U | 5/2022 |
| CN | 216928688 U | 7/2022 |
| CN | 217198610 U | 8/2022 |
| KR | 20240094578 A | 6/2024 |
| WO | 2023159852 A1 | 8/2023 |

\* cited by examiner

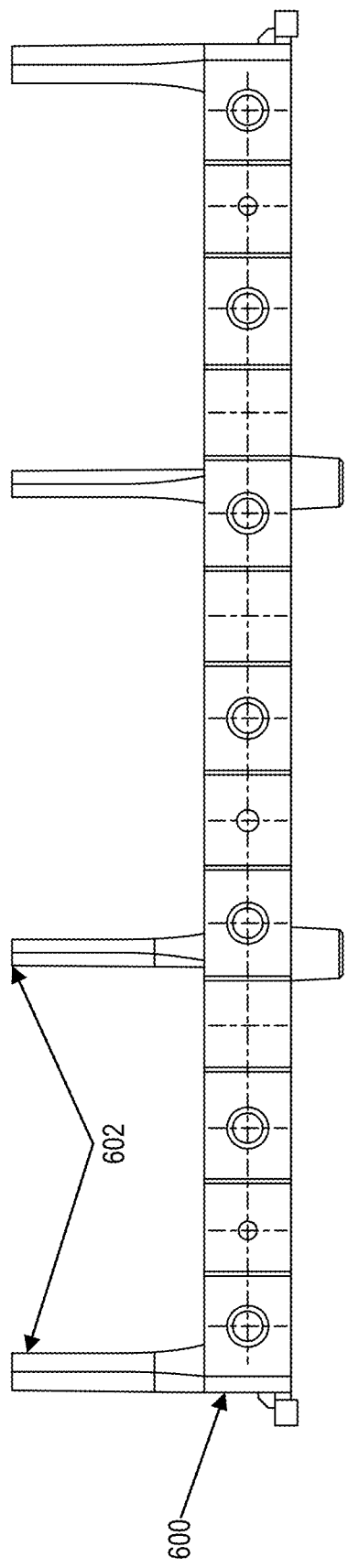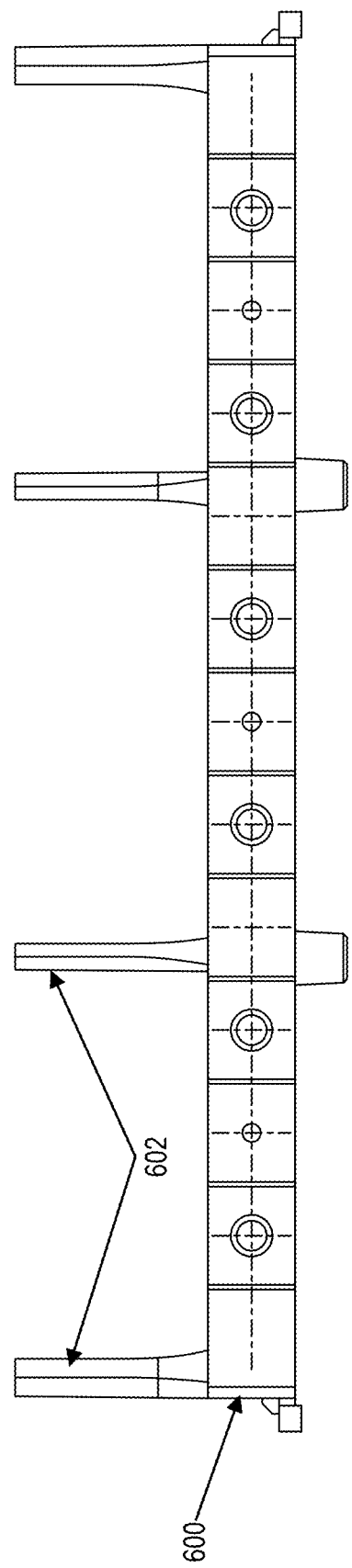
FIG. 6C
FIG. 6D

Provide A Battery Pack Comprising: A Chassis Including A Top Panel, A Bottom Panel, A First Sidewall Extending Along A Length Of The Top Panel And The Bottom Panel, A Front Flange Extending Along A Width Of The Top Panel And The Bottom Panel, And A Rear Flange Extending Along A Width Of The Top Panel And The Bottom Panel, Wherein The Top Panel, Bottom Panel, First Sidewall, Second Sidewall, Front Flange, And Rear Flange Form A Waterproof Enclosure; A High Voltage Battery Comprising A Plurality Of Battery Cells Disposed Within The Chassis; A Positive High Voltage Connector Disposed On The Front Flange Of The Chassis, The Positive High Voltage Connector Being Electrically Coupled To A Positive Terminal Of A High Voltage Battery; A Negative High Voltage Connector Disposed On The Front Flange Of The Chassis, The Negative High Voltage Connector Being Electrically Coupled To A Negative Terminal Of The High Voltage Battery; A Manual Disconnect Connector Disposed On The Front Flange Of The Chassis; A Signals Connector Disposed On The Front Flange Of The Chassis, The Signals Connector Configured For Signal Communication With At Least A Power Distribution Unit And A Vessel Control Unit; And A Battery Management System Disposed Within The Chassis And Coupled To The Signals Connector, The Battery Management System Comprising: A Battery Management Controller; A Plurality Of Relays Operable By The Battery Management Controller; And A Plurality Of Sensors Electrically Coupled To The Battery Management Controller 702

↓

Couple The Positive High Voltage Connector And The Negative High Voltage Connector Of The Battery Pack To A Power Distribution Unit Of The Electric Marine Vessel 704

↓

Couple An HVIL Circuit Of The Battery Pack To An HVIL Circuit Of The Power Distribution Unit Via The Signals Connector 706

↓

Couple The Battery Pack To A Vessel Control Area Network (CAN) Bus Via The Signals Connector, The Vessel CAN Bus Providing Communication With A Vessel Control Unit 708

FIG. 7

BATTERY PACK FOR AN ELECTRIC MARINE VESSEL

FIELD OF THE TECHNOLOGY

The present disclosure relates to methods, apparatuses, and computer program products for a battery pack for an electric marine vessel.

BACKGROUND

Advances in battery technology have paved the way for full-electric vehicles. Building on those advances, technology to enable full-electric watercraft has been widely adopted. However, the challenges of designing electric vehicles are different from the challenges of designing electric boats. The transformation of existing watercraft platforms to a full-electric platform also poses a different set of challenges.

SUMMARY

According to embodiments of the present disclosure, various methods, apparatuses, and computer program products for a battery pack for an electric marine vessel are described herein. In some aspects, an example battery pack for an electric marine vessel comprises a chassis including a top panel, a bottom panel, a first sidewall and a second sidewall that each extend along a length of the top panel and the bottom panel, a front flange and a rear flange that each extend along a width of the top panel and the bottom panel, wherein the top panel, the bottom panel, the first sidewall, the second sidewall, the front flange, and the rear flange together form a waterproof enclosure. The example battery pack also includes a high voltage battery comprising a plurality of battery cells disposed within the chassis. The example battery pack also includes a positive high voltage connector disposed on the front flange of the chassis, the positive high voltage connector being electrically coupled to a positive terminal of the high voltage battery. The example battery pack also includes a negative high voltage connector disposed on the front flange of the chassis, the negative high voltage connector being electrically coupled to a negative terminal of the high voltage battery. The example battery pack also includes a manual disconnect connector disposed on the front flange of the chassis. The example battery pack also includes a signals connector disposed on the front flange of the chassis, the signals connector configured for signal communication with at least a power distribution unit and a vessel control unit. The example battery pack also includes a battery management system disposed within the chassis and coupled to the signals connector. The battery management system includes a battery management controller, a plurality of relays operable by the battery management controller, and a plurality of sensors electrically coupled to the battery management controller.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 6C is a side view of the example cell holder of FIG. 6A.

FIG. 6D is an opposite side view of the example cell holder of FIG. 6C.

FIG. 7 sets forth a flow chart of an example method for a battery pack for an electric marine vessel in accordance with at least one embodiment of the present disclosure.

DETAILED DESCRIPTION

Figure 1A:
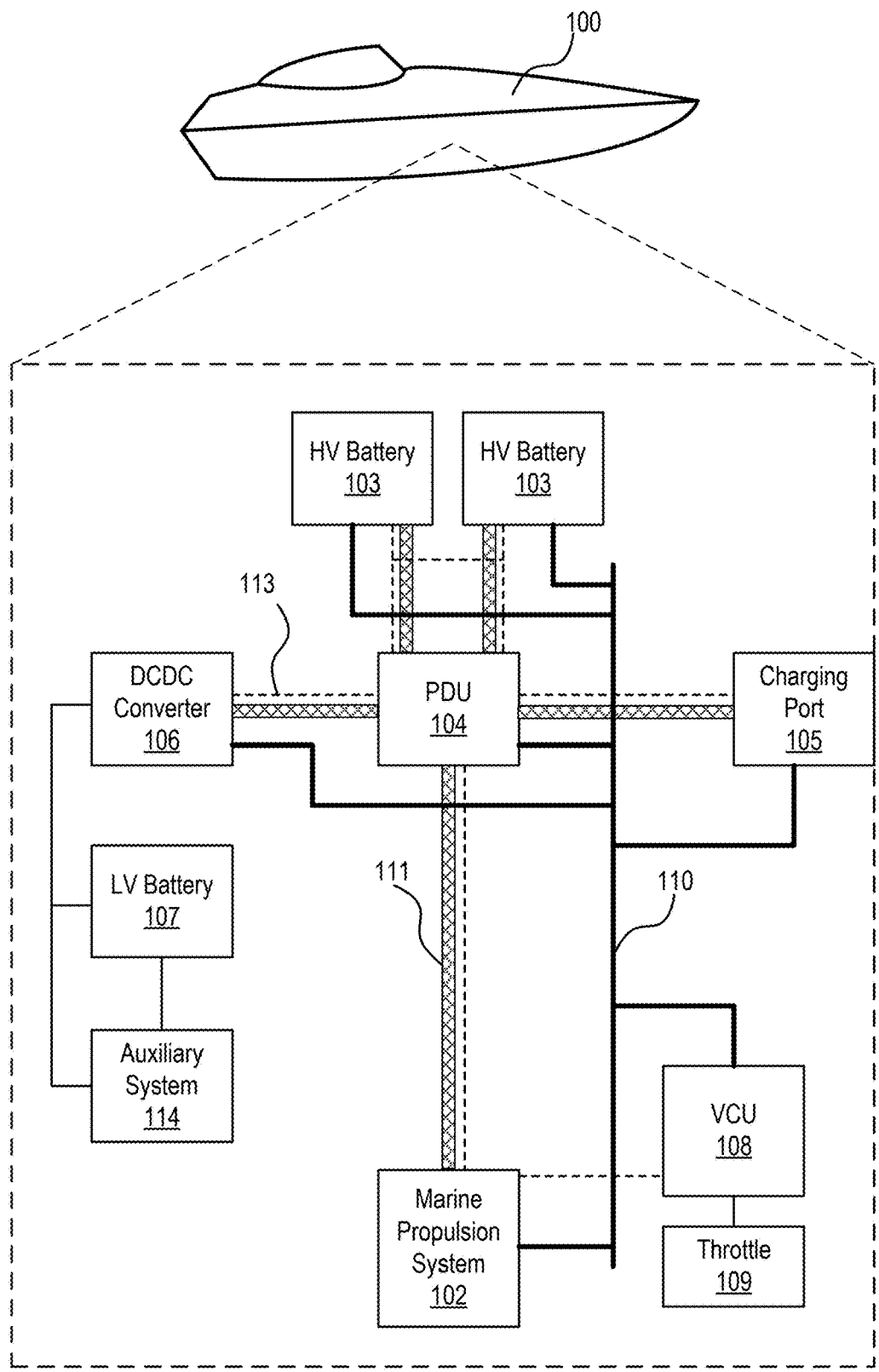
FIG. 1A sets forth a block diagram of an example electric marine vessel utilizing a battery pack in accordance with at least one embodiment of the present disclosure.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled via one or more intervening elements. If two elements are "electrically coupled," an electrical signal is conveyed through a physical medium or media, either directly or through one or more intervening elements, between the elements. If two elements are "communicatively coupled," there exists a physical or wireless communication channel between the two elements for the transfer of data between the elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Advances in battery technology have paved the way for full-electric vehicles. Building on those advances, technology to enable full-electric watercraft has been widely adopted. However, the challenges of designing electric vehicles are different from the challenges of designing electric boats. The transformation of existing watercraft platforms to a full-electric platform also poses a different set of challenges.

Battery packs for electric vehicles typically have a form factor that is long and wide but relatively thin to make it suitable for placement under the cabin of the vehicle. However, due to the nature of hull designs, this type of form factor is not well-suited for marine applications. Similarly, the arrangement of connectors on electric vehicle battery packs makes them unsuitable for marine applications. Further, unlike electric vehicles, electrical components for electric marine vessels should be waterproof.

To address these and other issues, embodiments in accordance with the present disclosure provide a waterproof battery pack designed for an electric marine vessel. The form factor of the battery pack is suited for placement in the vessel hull and can be accommodated by conventional marine vessels in place of a gas tank. The arrangement and locations of connectors on the battery pack are optimized for connection of the battery pack to the electric powertrain of the electric marine vessel. Enhanced safety features automatically open the relays with the battery pack in the event a disconnect or other malfunction occurs. Enhanced security features prevent the battery pack from being used outside of the vessel.

FIG. 1A sets forth an example electric vessel 100 in accordance with the present disclosure. FIG. 1A is provided to emphasize the powertrain components of vessel 100. It will be appreciated that vessel 100 may include other components not shown or described herein. Vessel 100 may be any type of watercraft. In a particular example, vessel 100 includes a full-electric powertrain and thus may also referred to as an 'electric boat.' To that end, vessel 100 includes a marine propulsion system 102. For example, marine propulsion system 102 may be a full-electric outboard motor or inboard motor with a propeller, or a full-electric jet craft with an impeller. The marine propulsion system is described in more detail below with reference to FIG. 1B.

The marine propulsion system 102 is powered by one or more high voltage batteries 103. In the example, of FIG. 1A, two high voltage batteries 103 are shown; however, it will be appreciated a vessel 100 in accordance with the present disclosure may include fewer or more high voltage batteries. High voltage batteries operate at voltages ranging from a few hundred to over 800 volts, depending on the design and application. Higher voltages allow for more efficient power transmission and reduced current flow, which helps minimize energy losses. Each high voltage battery 103 includes multiple modules, each containing several individual battery cells connected in series and parallel configurations to achieve the desired voltage and capacity. These cells may be arranged in a pack that optimizes space utilization and facilitates thermal management. Each high voltage battery 103 includes or is coupled to a battery management system (BMS). The BMS is responsible for monitoring and controlling various parameters such as voltage, current, temperature, and state of charge (SoC) of individual cells within the pack. The BMS helps optimize battery performance, protect against overcharging or over-discharging, and ensures safety. The BMS communicates with other vessel components about battery state, receives commands to change the battery state, and controls the opening and closing of the main contactors in the battery. The high voltage battery 103 is described in more detail below with reference to FIG. 1C.

The marine propulsion system 102 receives power from the high voltage battery 103 via a power distribution unit (PDU) 104. The PDU 104 receives high-voltage DC power from the high voltage batteries 103 and routes it to different subsystems and components within vessel 100, such as the electric marine propulsion system 102 and other subsystems such as a DCDC converter 106. The PDU 104 also couples the high voltage batteries 103 to a charging port 105 for charging the high voltage batteries 103. The PDU 104, as explained in more detail below with reference to FIG. 1D, includes a set of contactors that are controlled by logic or software in the PDU 104 to ensure safety when switching the flow of power among various vessel components.

The DCDC converter 106 provides voltage conversion capabilities to step down the high-voltage DC power to lower voltages required by an auxiliary system 114, such as the 12-volt electrical system used for lights, accessories, and onboard electronics. The DCDC converter 106 may be used to charge a lower voltage battery such as a 12-volt marine battery 107.

Vessel 100 further includes a vessel control unit 108. Vessel control unit 108 serves as the central control unit responsible for managing and coordinating various functions and systems onboard the vessel 100. For example, the vessel control unit 108 can provide propulsion control, including regulating engine speed, torque, and direction to achieve desired propulsion performance and maneuverability in accordance with commands or signals received from the vessel's throttle control 109. The vessel control unit 108 can also manage the vessel's steering system. The vessel control unit 108 can also control startup/shut down routines, control charging/operation mode selection, control the opening and closing of contactors in the PDU 104, monitor the state of onboard systems, perform vessel diagnostics, and interface with an operator dashboard. To that end, the vessel control unit 108 may communicate with the other vessel powertrain components (e.g., the marine propulsion system 102, the high voltage battery 103, the PDU 104, the DCDC converter 106, and so one) via a control area network (CAN), referred to herein as a CAN bus 110. The vessel control unit 108 will be described in more detail below with reference to FIG. 1E.

The CAN bus 110 may be a two-wire serial bus that allows multiple components and devices within a vessel to communicate with each other without a host computer. The CAN bus 110 may use a message-based communication scheme where components and devices send and receive data in the form of messages. Each message includes a CAN identifier (CAN ID), data bytes, and control bits. The CAN bus 110 may employ a multi-master architecture, in that any device on the network can initiate a message transmission. This distributed architecture allows for efficient communication between vessel components without the need for a centralized controller. In a particular example, the CAN bus 110 may implement the NMEA2000 protocol, a standard set forth by the National Marine Electronics Association. NMEA2000 provides optimization and messaging for a marine environment.

Vessel 100 can also include a high voltage interlock loop (HVIL) system, which is a safety feature designed to ensure the safe operation and maintenance of the high-voltage components. HVIL is a dedicated circuit that ensures the high voltage connectors are well inserted in the equipment mating connector to ensure the safety of the high voltage connections. HVIL is used by the high voltage battery BMS and the vessel control unit 108 to confirm the integrity of these connections before applying high voltage energy to each high voltage device in the vessel.

For ease of reference, in FIG. 1A power interconnects 111 supplying high voltage power are shown in hash-filled lines, data interconnects for CAN bus 110 are shown in thick solid black lines, and HVIL interconnects 113 are shown in dashed lines.

Figure 1B:
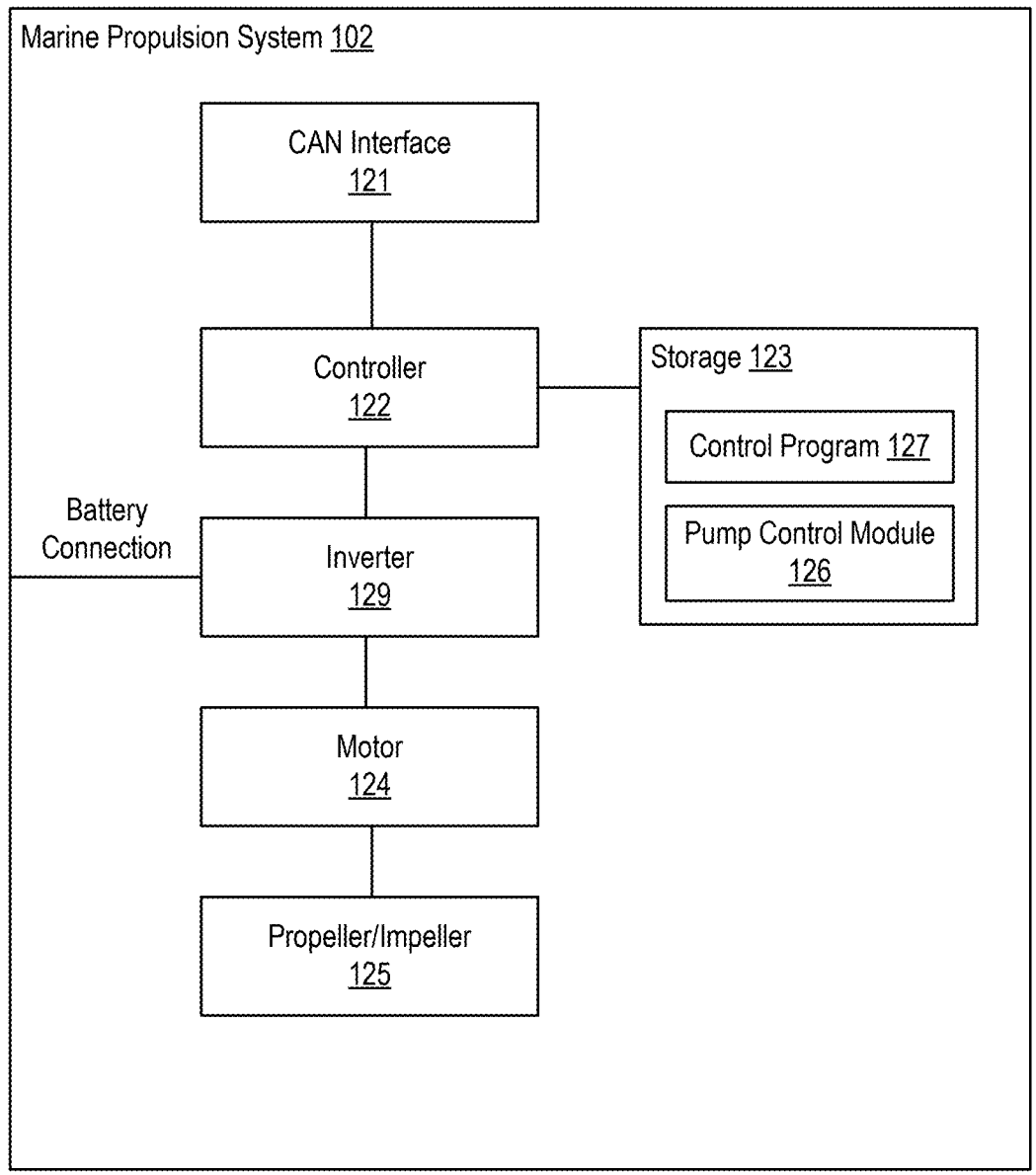
FIG. 1B sets forth a block diagram of an example marine propulsion system for electric marine vessel utilizing a battery pack in accordance with at least one embodiment of the present disclosure.

For further explanation, FIG. 1B sets forth a block diagram of an example of the electric marine propulsion system 102 in accordance with at least one embodiment of the present disclosure. The example marine propulsion system 102 of FIG. 1B includes a CAN interface 121 for coupling the marine propulsion system 102 to the CAN bus 110. For example, the CAN interface 121 may be a network interface controller configured to send and receive messages in the form of CAN frames over the CAN bus 110.

The example marine propulsion system 102 also includes a controller 122 coupled to the CAN interface 121. The controller 122 may include or implement a processor, a microcontroller, an Application Specific Integrated Circuit (ASIC), a programmable logic array (PLA) such as a field programmable gate array (FPGA), or other data processing unit in accordance with the present disclosure. In some examples, the controller is implemented by a processor or central processing unit configured to execute computer programming instructions, also referred to a computer executable instructions or processor executable instruction. Such instruction can be loaded from and stored in one or more memory devices collectively referred to as storage 123. Storage 123 may include electrically erasable programmable read-only memory (EEPROM) such as Flash memory (e.g., NAND and NOR flash memory or other types of solid-state memory), dynamic random-access memory (DRAM), static RAM (SRAM), magnetic disk storage, and the like. The storage 123 may be integrated with the controller 122 or provided as a separate memory device coupled to the controller 122.

The marine propulsion system 102 also includes an inverter 129 that is powered by the high voltage batteries 103. The inverter 129 functions to convert the DC current received from the high voltage batteries 103 to alternating current (AC) that can be used by an electric motor. In some examples, the inverter 129 is a high voltage two-phase DC to a high voltage three-phase AC converter. The marine propulsion system also includes an electric motor 124 coupled to a propeller/impeller 125. The electric motor 124 is powered by the current received from the inverter 129. The electric motor 124 is an electric traction motor that turns a drive shaft (not shown) that drives the propeller/impeller 125. In some examples, the electric motor is a permanent magnet electric motor. The electric motor 124 is designed to withstand exposure to water and corrosive marine environments, featuring waterproof enclosures, sealed bearings, and corrosion-resistant materials to ensure reliable operation in wet conditions. The electric motor 124 operates quietly, producing minimal noise and vibration compared to traditional combustion engines, which contributes to a quieter boating experience as well as reduced noise pollution in aquatic environments. The electric motor 124 offers high efficiency and energy density, allowing electric boats to achieve comparable performance to traditional boats powered by combustion engines while using less energy and producing fewer emissions.

A control program 127 embodied in computer programing instructions is stored within tangible persistent storage of storage 123. When executed by the controller 122, the control program 127 is configured to receive commands from the vessel control unit 108 and control the electric motor 124 in accordance with those commands. For example, the control program 127 may be configured to regulate the distribution of electrical energy from the inverter 129 to the electric motor 124. In this example, the control program 127 may receive a throttle/speed command from the vessel control unit 108 and determine the frequency variation or voltage variation that will enter the electric motor 124 for controlling the vessel's speed. The control program 127 is further configured to receive motor state information from various sensors (not shown) and supply motor state information and diagnostic information to the vessel control unit 108. Also stored in tangible persistent storage of storage 123 is a pump controller program 126 for controlling a cooling system water intake pump of the marine propulsion system. The pump controller program 126 receives information describing an operating state of an electric propulsion device of a marine vessel. The information indicates at least one of a motor speed of an electric motor and temperature readings within the electric propulsion system. The pump controller program 126 controls a water intake pump of a cooling system for the electric propulsion device based on the received information. Additional aspects of the pump controller will be described in more detail below.

Figure 1C:
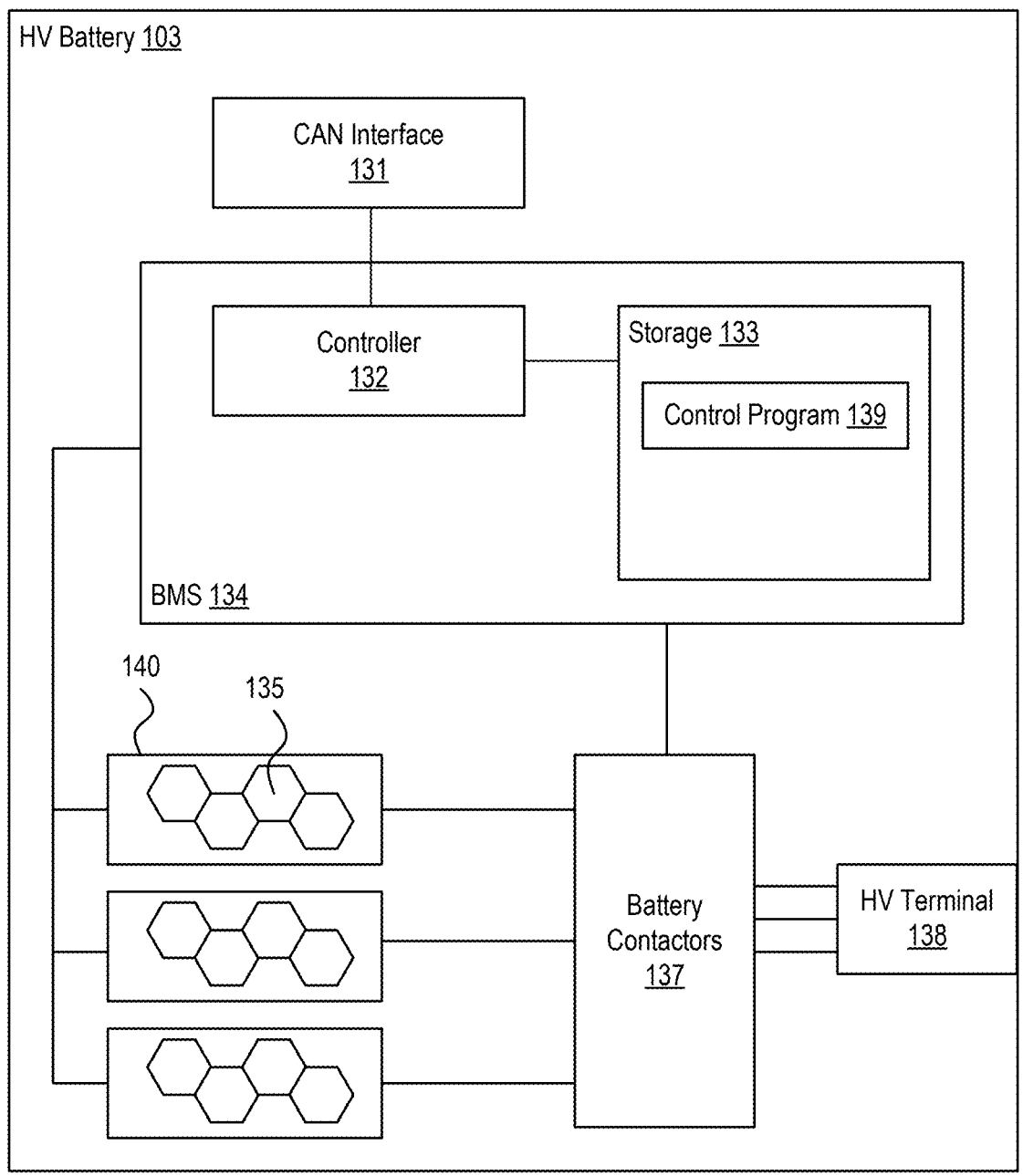
FIG. 1C sets forth a block diagram of an example high voltage battery for an electric marine vessel in accordance with at least one embodiment of the present disclosure.

For further explanation, FIG. 1C sets forth a block diagram of an example of the high voltage battery 103 in accordance with at least one embodiment of the present disclosure. The example high voltage battery 103 of FIG. 1C includes a CAN interface 131 for coupling the high voltage battery 103 to the CAN bus 110. For example, the CAN interface 131 may be a network interface controller configured to send and receive messages in the form of CAN frames over the CAN bus 110. The example high voltage battery 103 includes array of battery cells 135 organized into battery modules 140 or battery packs, and a set of battery contactors 137 that selectively couple the battery modules 140 to high voltage terminals 138 of the battery 103.

The example high voltage battery 103 also includes a battery management system (BMS) 134 comprising a controller 132 coupled to the CAN interface 131. Controller 132 may include or implement a processor, a microcontroller, an ASIC, PLA such as an FPGA, or other data processing unit in accordance with the present disclosure. In some examples, controller 132 is implemented by a processor or central processing unit configured to execute computer programming instructions, also referred to a computer executable instructions or processor executable instruction. Such instructions can be loaded from and stored in one or more memory devices collectively referred to as storage 133. Storage 133 may include EEPROM such as Flash memory (e.g., NAND and NOR flash memory or other types of solid-state memory), DRAM, SRAM, magnetic disk storage, and the like. The battery management system 134 further includes a variety of sensors (not shown) coupled to battery cells for measuring battery state information. The storage 133 may be integrated with the controller 132 or provided as a separate memory device coupled to the controller 132.

The BMS 134 includes a control program 139 embodied in computer programing instructions stored in tangible persistent storage of storage 133. In some examples, the control program 139 controls the state of the battery contactors for selectively coupling and decoupling the battery modules 140 to the high voltage terminals 138 of the battery 103. In some examples, the control program 139 also monitors battery state information such as voltage, current, and temperature in battery cells 135 via the above-mentioned sensors. In some examples, the control program 139 also communicates with the vessel control unit 108 to provide battery state information. The control program also controls the charging of the battery cells 135.

Figure 1D:
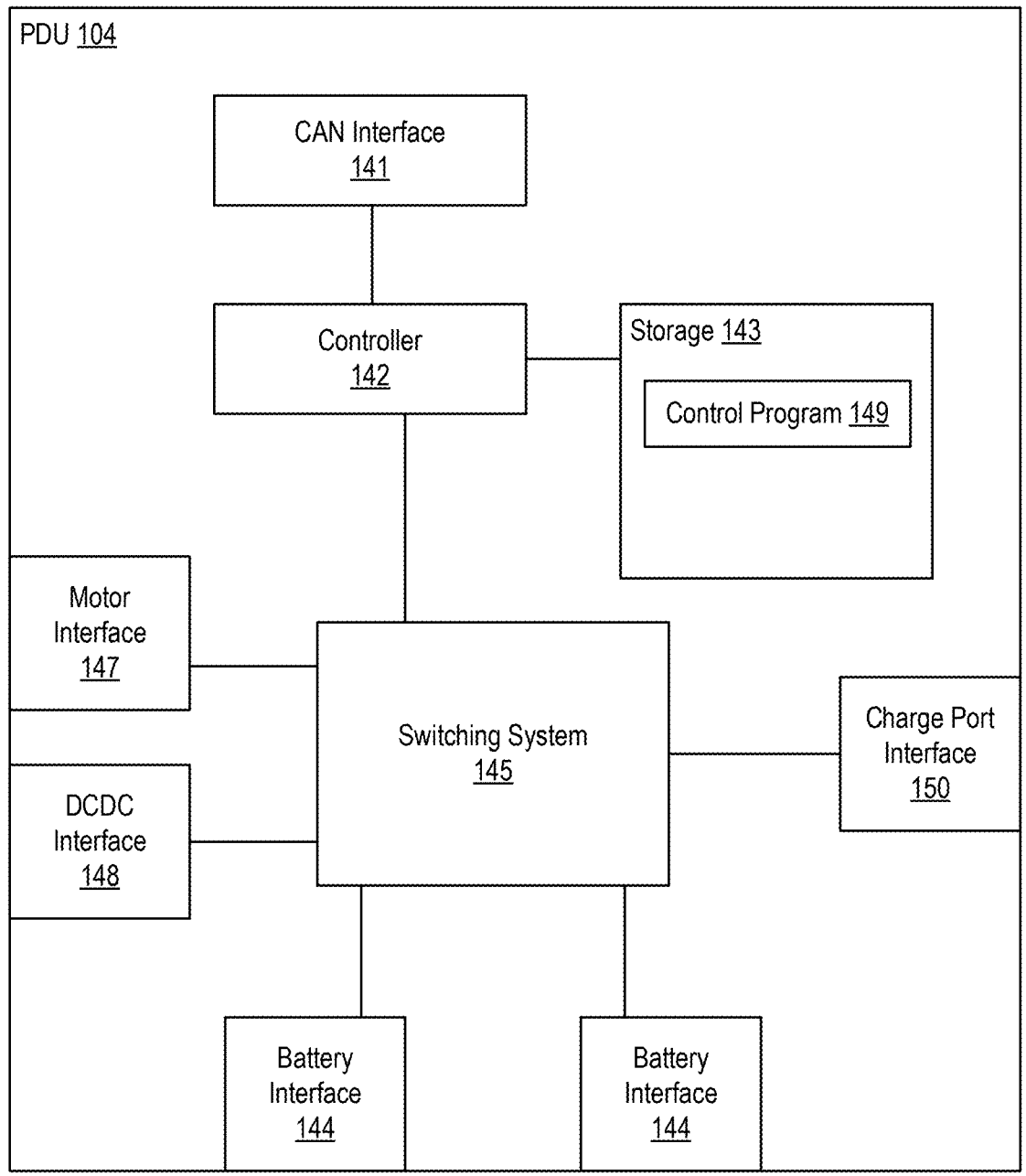
FIG. 1D sets forth a block diagram of an example power distribution unit for an electric marine vessel utilizing a battery pack in accordance with at least one embodiment of the present disclosure.

For further explanation, FIG. 1D sets forth a block diagram of an example of the PDU 104 in accordance with at least one embodiment of the present disclosure. The example PDU 104 of FIG. 1D includes a CAN interface 141 for coupling the PDU 104 to the CAN bus 110. For example, the CAN interface 141 may be a network interface controller configured to send and receive messages in the form of CAN frames over the CAN bus 110. The PDU 104 also includes a battery interface 144 coupling the high voltage batteries 103 to a switching system 145 of the PDU 104, a charge port interface 150 coupling the charging port 105 to the switching system 145, a motor interface 147 coupling the marine propulsion system 102 to the switching system 145, and a DCDC interface 148 coupling the DCDC converter 106 to the switching system 145. The switching system 145 includes a set of contactors (not shown for simplicity) by which the PDU 104 supplies power from the high voltage batteries 103 to the marine propulsion system 102 and to the DCDC converter 106, or supplies power from the charging port 105 to the high voltage batteries 103.

The example PDU 104 also includes a controller 142 that may include or implement a processor, a microcontroller, an ASIC, PLA such as an FPGA, or other data processing unit in accordance with the present disclosure. In some examples, the controller 142 is implemented by a processor or central processing unit configured to execute computer programming instructions, also referred to a computer executable instructions or processor executable instruction. Such instructions can be loaded from and stored in one or more memory devices collectively referred to as storage 143. Storage 143 may include EEPROM such as Flash memory (e.g., NAND and NOR flash memory or other types of solid-state memory), DRAM, SRAM, magnetic disk storage, and the like. The storage 143 may be integrated with the controller 142 or provided as a separate memory device coupled to the controller 122.

The PDU 104 also includes a control program 149 embodied in computer programing instructions stored in tangible persistent storage of storage 143. When executed by the controller 142, the control program 149 is configured to receive commands from the vessel control unit 108 and control the switching system 145 to connect and disconnect power supplied to vessel components. The control program 149 is also configured to provide state information to vessel control unit 108.

Figure 1E:
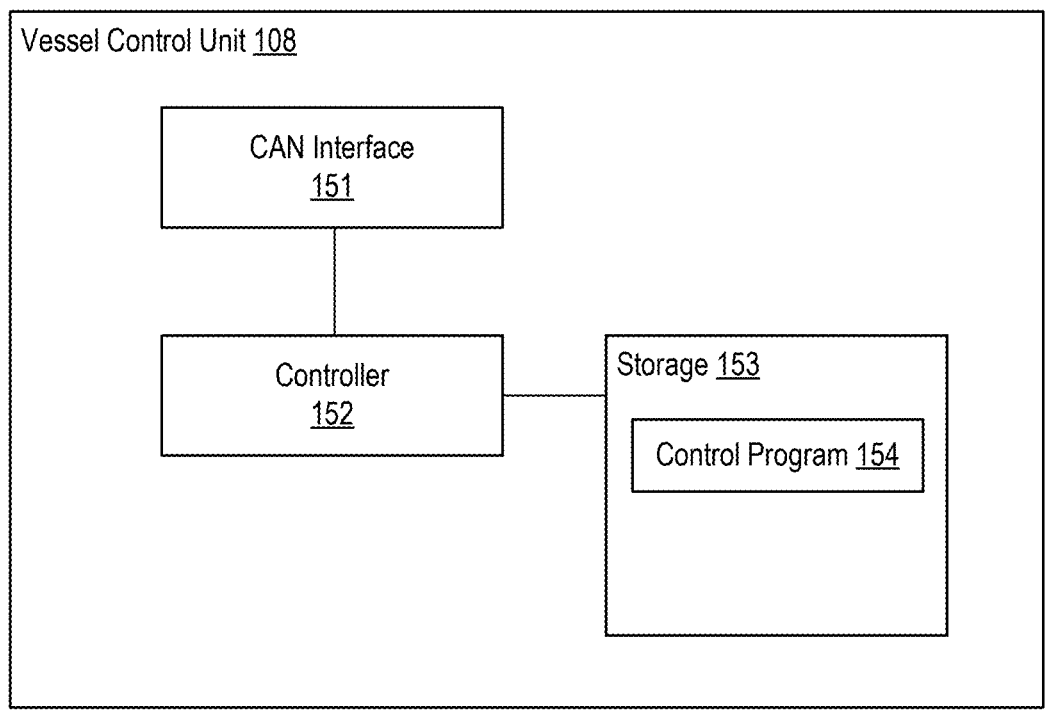
FIG. 1E sets forth a block diagram of an example vessel control unit for an electric marine vessel utilizing a battery pack in accordance with at least one embodiment of the present disclosure.

For further explanation, FIG. 1E sets forth a block diagram of an example of vessel control unit 108 in accordance with at least one embodiment of the present disclosure. The example vessel control unit 108 of FIG. 1E includes a CAN interface 151 for coupling the vessel control unit 108 to the CAN bus 110. For example, the CAN interface 151 may be a network interface controller configured to send and receive messages in the form of CAN frames over the CAN bus 110.

The example vessel control unit 108 also includes a controller 152 that may include or implement a processor, a microcontroller, an ASIC, PLA such as an FPGA, or other data processing unit in accordance with the present disclosure. In some examples, controller 152 is implemented by a processor or central processing unit configured to execute computer programming instructions, also referred to a computer executable instructions or processor executable instruction. Such instructions can be loaded from and stored in one or more memory devices collectively referred to as storage 153. Storage 153 may include EEPROM such as Flash memory (e.g., NAND and NOR flash memory or other types of solid-state memory), DRAM, SRAM, magnetic disk storage, and the like. The storage 153 may be integrated with the controller 152 or provided as a separate memory device coupled to the controller 152.

The vessel control unit 108 also includes a control program 154 embodied in computer programing instructions stored in tangible persistent storage of storage 153. When executed by controller 152, the control program 154 is configured to send commands to other vessel components and receive state information and diagnostic data from vessel components as discussed above.

Figure 2:
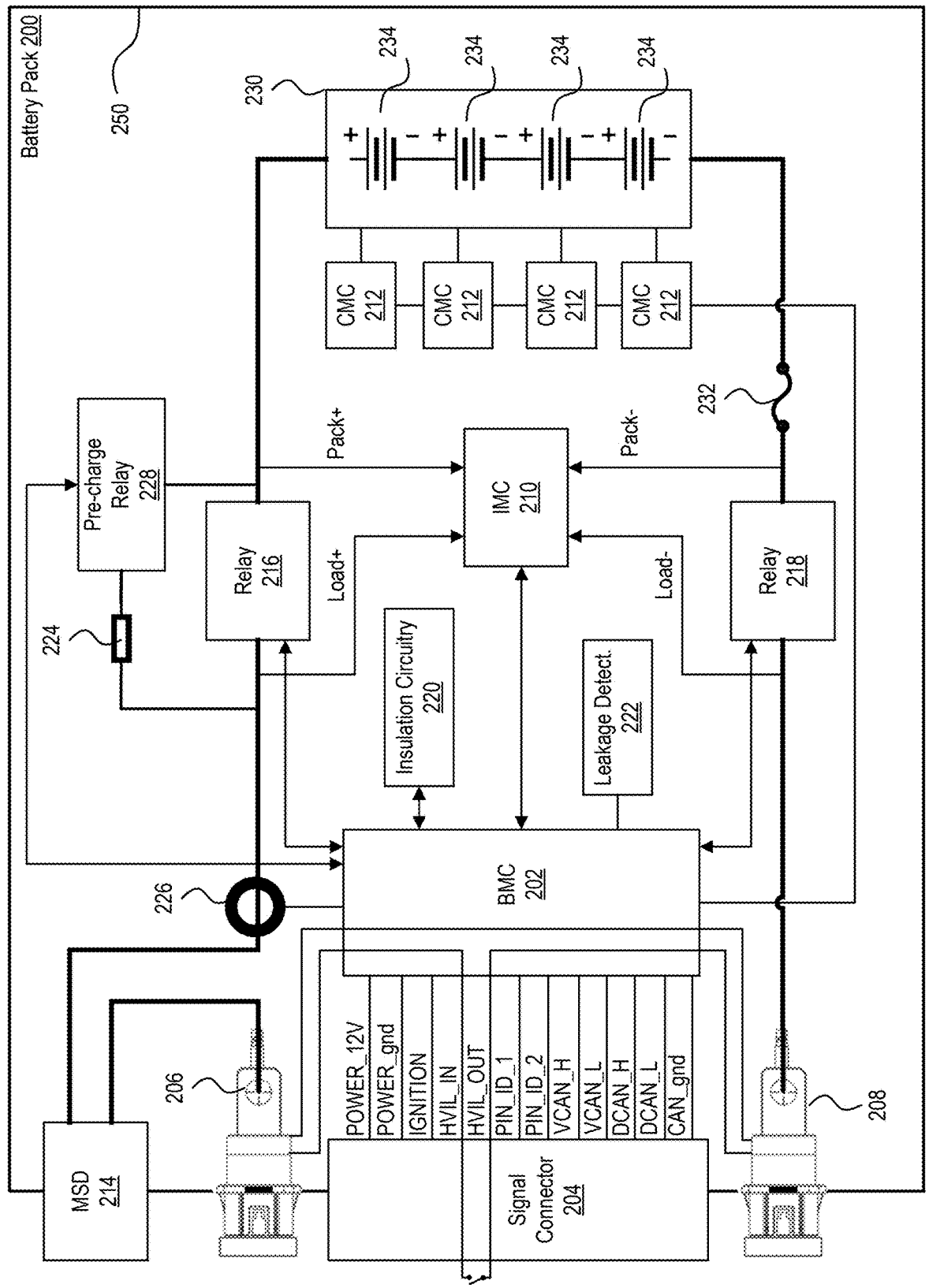
FIG. 2 sets forth a block diagram of an example battery pack for an electric marine vessel in accordance with at least one embodiment of the present disclosure.

FIG. 2 sets forth a schematic of an example high voltage (HV) battery pack 200 for an electric marine vessel in accordance with the present disclosure. The battery pack 200 is enclosed in a chassis 250. Particular external interfaces of the battery pack 200 include a signal connector 204, an HV+ plug 206, and HV− plug 208, and a manual service disconnect (MSD) connector 214 used for breaking the electrical continuity within the battery pack 200 in the event of a fault. The HV+ plug 206 is couplable to a PDU, such as the PDU 104 described above. Within the battery pack 200, the HV+ plug is electrically coupled to a relay 216 via MSD connector 214. A disconnect of the MSD connector 214 causes a break in the connection of the HV+ plug 206 to the relay 216, thus providing a disconnect of the battery pack 200 to the PDU for safe servicing of the vessel. The relay 216 is coupled to a positive terminal of a battery device 230 that includes multiple battery cells 234. In an example, the battery cells 234 are connected in series between positive and negative terminals of the battery device 230. It will be appreciated that the battery device 230 may also include multiple parallel strings of battery cells 234. Although four battery cells 234 are shown for illustration, it will be appreciated that any number of battery cells may be employed. Like the HV+ plug 206, the HV− plug 208 is couplable to the PDU. Within the battery pack 200, the HV− plug 208 is electrically coupled to a relay 218, which is in turn electrically coupled to the negative terminal of the battery device 230 through a fuse 232. The fuse 232 provides overcurrent protection in the event of a fault in the battery device 230. Accordingly, activation of the relays 216, 218 closes a circuit between the HV+ plug 206 and the HV− plug 208 through the battery device 230 for providing HV power to the PDU. In some examples, the relays 216, 218 and/or the fuse 232 are embedded with a voltage leak detector.

The battery pack 200 also includes a battery management controller (BMC) 202 for a battery management system, such as the battery management system 134 discussed above. The BMC 202 can be implemented as an ASIC, a microcontroller, a programmable logic device, a processor executing instructions stored in a memory device, or other circuitry configurable to implement the functionality of the BMC 202 described herein. The BMC 202 is communicatively coupled to the relay 216 through one or more interconnects for providing commands to the relay 216 and receiving state information from the relay 216. A command from the BMC 202 to the relay 216 opens or closes the relay in accordance with the command. In some examples, the relay 216 also includes an auxiliary contactor, with auxiliary input and auxiliary output signals coupled to the BMC 202. The BMC 202 is also communicatively coupled to the relay 218 through one or more interconnects for providing commands to the relay 218 and receiving state information from the relay 218. A command from the BMC 202 to the relay 218 opens or closes the relay in accordance with the command. In some examples, the relay 218 also includes an auxiliary contactor, with auxiliary input and auxiliary output signals coupled to the BMC 202.

The battery pack 200 also includes a pre-charge relay 228 and pre-charge resistor 224 for pre-charging the inverter of the marine propulsion system before the HV connection is established between the battery pack 200 and the inverter. A command from the BMC 202 to the pre-charge relay 228 opens or closes the relay in accordance with the command. In some examples, the pre-charge circuit in the battery manages a 1 mF capacitor at the input of the inverter 129. Each time the battery pack 200 transitions from an IDLE to an ACTIVE state, a pre-charge sequence is completed by the BMC 202 before enabling the HV+ relay. If the BMC 202 detects an abnormal consumption during pre-charge, the BMC 202 transitions to a FAILURE state and opens the contactors.

The battery pack 200 also includes an isolated measurement controller (IMC) 210 that is electrically coupled to the HV+ line between the relay 216 and the battery device 230 to measure a positive voltage (Pack+) supplied by the battery device 230. The IMC 210 is also electrically coupled to the HV+ line on the output side of the relay 216 to measure a positive load (Load+) on the battery pack 200. The IMC 210 is electrically coupled to the HV− line between the relay 218 and the battery device 230 to measure a negative voltage (Pack−) supplied by the battery device 230. The IMC 210 is also electrically coupled to the HV− line on the output side of the relay 218 to measure a negative load (Load−) on the battery pack 200. The IMC 210 provides the measurements for Pack+, Load+, Pack−, and Load− to the BMC 202. Thus, the IMC 210 isolates the BMC 202 from the HV lines. The battery pack 200 also includes a current sensor 226 coupled to at least one of the HV lines for measuring load current.

The battery pack 200 also includes insulation circuitry 220. In some examples, the insulation circuitry 220 includes an insulation barrier that provides insulation for digital, pulse width modulated, and 12V power supply. The insulation barrier may be coupled to an insulation board. For example, the insulation board may be coupled to the HV+ and HV− by respective relays that are controlled by the BMC 202. The insulation board may be coupled to ground via connection to the chassis 250.

The battery pack 200 also includes cell measurement controllers (CMC) 212. Each battery cell 234 is coupled to a respective CMC 212. The CMC 212 reads measurements of the battery cell 234 such as the voltage and temperature of the battery cell 234. The CMC 212 provides these measurements to the BMC 202.

The battery pack 200 also includes a leakage detector 222 that detects whether there is a coolant leak or the presence of water in the battery pack 200. The leakage detector 222 wakes up as soon as an IGNITION signal turns ON (e.g., transitions from low to high) to control any leakage present inside the battery and before closing the contactors. In the ACTIVE state (relays closed), the BMC 202 can receive a command to start the leakage detector at any moment to control the HV line in the vessel.

The BMC 202 monitors the condition of the battery pack 200 based on measurements including voltage and temperature measurements of the battery cells 234 from the CMCs 212, voltage measurements of the battery output and the load on the battery pack 200 from the IMC 210, signals from the leakage detector 222, and current measurements from the current sensor 226 to determine whether the battery pack 200 should be placed in a FAILURE state. For example, the BMC 202 can detect a thermal runaway event, a battery short, an overcurrent condition, an overvoltage condition, an undervoltage condition, and so on based on these measurements. When these measurements do not indicate a FAILURE state, the BMC 202 will control the opening and closing of the relays 216, 218 in accordance with signals from the VCU 108 and/or the PDU 104. In response to an IGNITION signal going high, the BMC 202 will wake up and place the battery pack 200 in an ACTIVE state, execute the pre-charge sequence to pre-charge the inverter of the marine propulsion system, and then close the relays 216, 218 to provide HV power to the inverter. In response to the IGNITION signal going low, the BMC 202 will open the relays 216, 218 and place the battery pack 200 in an IDLE state. In a FAILURE state, the relays 216, 218 are always open.

The signal connector 204 is coupled to the BMC 202 to provide external signals to the BMC 202. In a particular implementation as shown in FIG. 2, the signal connector 204 provides a wake-up signal (IGNITION) to the BMC 202. The IGNITION signal provides 12V supply for the HVIL and for BMC 202 wake-up. The signal connector 204 also provides a 12V power signal (POWER_12V) to the BMC 202. The 12V power signal provides a power supply for the BMC 202, relays, insulation board, and other low voltage components. In these examples, the signal connector 204 also provides a ground (POWER_gnd) to the BMC 202. POWER_gnd provides a ground reference for the POWER and IGNITION supply. The signal connector 204 provides HVIL loop signals (HVIL_IN and HVIL_OUT) from the PDU 104 to the BMC 202. HVIL_IN is the input of the ignition 12V passed through the battery pack HVIL and PDU HVIL. HVIL_OUT is the output of the ignition 12V passed through the battery pack HVIL and going to the PDU HVIL before returning via HVIL_IN. Within the battery pack HVIL, an HVIL signal passes from HVIL_IN of the signal connector 204 through the BMC 202 to an HVIL input of the HV+ plug 206, from an HV output of the HV+ 206 through the BMC 202 to an HVIL input of the HV− plug 208, and from an HVIL output of the HV− plug 208 through the BMC 202 to HVIL_OUT of the signal connector 204. Thus, the BMC 202 can detect a break in the HVIL circuit within the battery pack 200 caused by a disconnect of the HV+ plug 206 or the HV− plug 208 (it will be appreciated that the positions of the HV plugs within the circuit can be reversed).

The signal connector 204 also provides identification numbers for the battery pack 200 to the BMC 202, where PIN_ID1 is the least significant bit of the battery pack 200 identifier and PIN_ID2 is the most significant bit of the battery pack 200 identifier. The signal connector 204 provides CAN bus signals (VCAN_H and VCAN_L) to the BMC 202. VCAN_H is the CAN high of the vessel-side CAN bus and is used for communication with the VCU 108. VCAN_L is the CAN low of the vessel-side CAN bus and is used for communication with the VCU 108. The signal connector 204 provides diagnostic CAN bus signals (DCAN_H and DCAN_L) to the BMC 202 and is used for diagnostics only. DCAN_H is the CAN high of the internal battery pack CAN bus. DCAN_L is the CAN low of the internal battery pack CAN bus. In some examples, the signal connector 204 provides a ground for the CAN bus to the BMC 202. CAN_gnd provides the ground reference for the vessel side CAN bus (VCAN_H and VCAN_L) and is the same electric potential as POWER_gnd. It will be appreciated that embodiments of the present disclosure may be realized without inclusion of all of the signals described above. It will also be appreciated that the signals connector 204 may provide additional signals not described above.

In a particular implementation, the BMC 202 wakes up when IGNITION is high and if POWER is high. The HVIL can be powered by the POWER or the IGNITION signal. CAN bus communication is only enabled when IGNITION is high. PIN_ID1 and PIN_ID2 are 0 at low and 1 at high. In a particular implementation, only '00', '01' and '10' are allowed as identifiers, where '11' (open connection) is detected as an error. The battery pack 200 need not manage any conflict if multiple batteries are set with the same ID. The VCU 108 manages the CAN bus period integrity.

Figure 3:
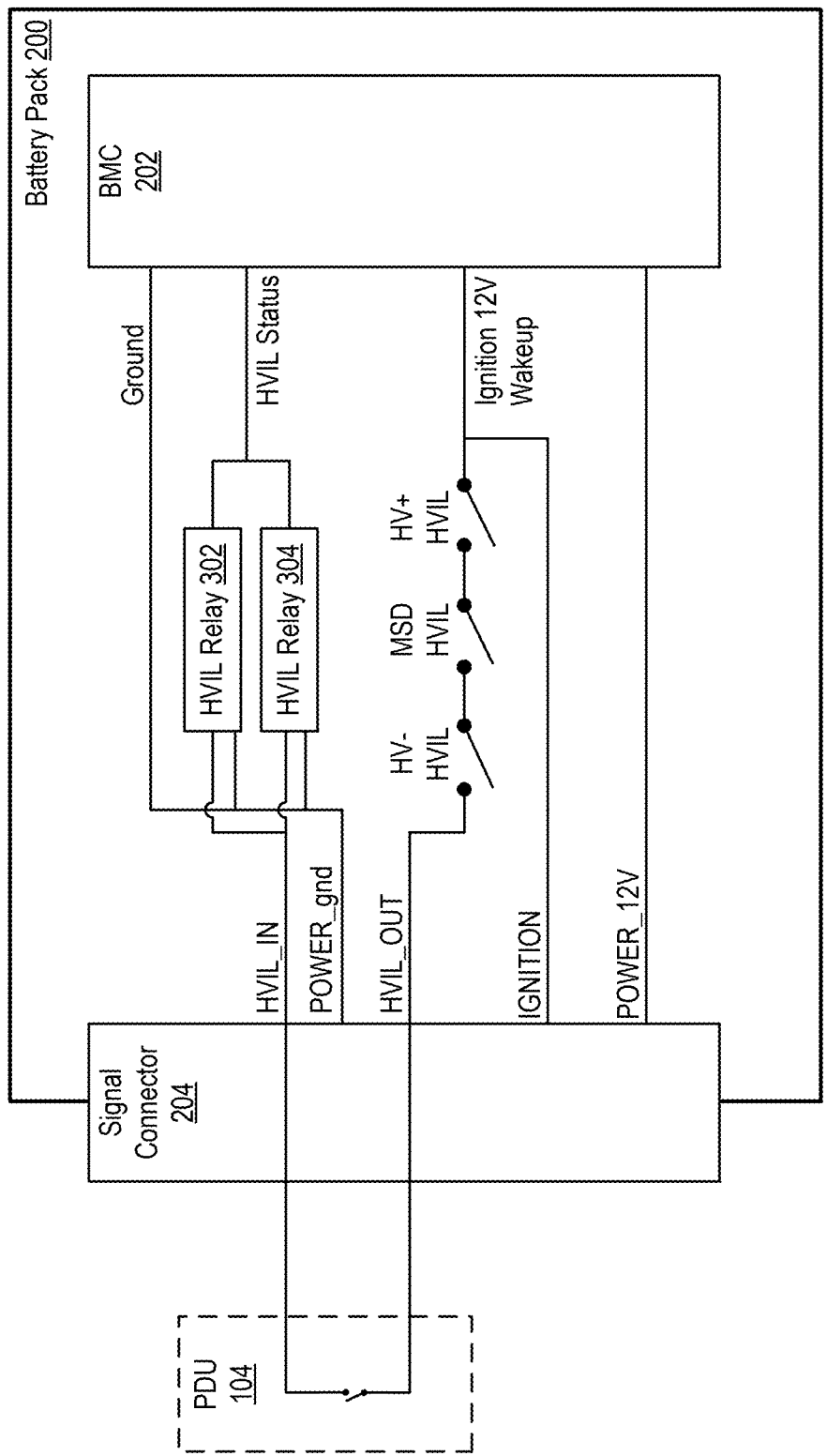
FIG. 3 sets forth a detailed view of an example signal interface of an example battery pack for an electric marine vessel in accordance with at least one embodiment of the present disclosure.

For further explanation, FIG. 3 sets forth a schematic of an example internal HVIL circuit for the battery pack 200 in accordance with at least one embodiment of the present disclosure. The example of FIG. 3 includes the signal connector 204 and the BMC 202 of FIG. 2. A loop of the HVIL system extends from the battery pack to the PDU and back to the battery pack such that a disconnection of the PDU and the battery pack will break the loop and trigger a FAILURE state. As shown in FIG. 3, HVIL_OUT is the IGNITION signal that is routed through HVIL_OUT to the PDU 104 and back into HVIL_IN, which is routed though the internal battery pack HVIL circuit that includes the HV+ HVIL connections and the HV− HVIL connections, and then back to HVIL_OUT. When any of the HV+ HVIL signal, the HV− HVIL signal, and the MSD signal are interrupted due to disconnect, the BMC 202 will detect the break in the loop and trigger a FAILURE state. In this case, HVIL_OUT of the battery pack is also interrupted. HVIL_IN and POWER_gnd are routed to first HVIL relay 302 and a second HVIL relay 304. When both HVIL relays 302, 304 are closed, the HVIL status input to the BMC 202 indicates that there is no failure in the HVIL system. When at least one HVIL relay 302, 304 is open, the HVIL status input to the BMC 202 indicates a failure state.

The relays 302, 304 open as soon as the HV+ or HV− cables are disconnected. The PDU 104 is equipped with such relays in order to automatically cut off the power supply power contacts. A fault detector in the battery pack 200 will detect 12V when the four HVIL switches are closed (two from the battery plugs and two from the PDU connectors). Thus, if the battery pack 200 is disconnected, the relays 216, 218 open and the battery state is placed in a FAILURE state. The FAILURE state has to be acknowledged and the HVIL error fixed before the BMC 202 transitions the battery pack 200 back to an IDLE state. The battery contactors are closed only in an ACTIVE state, after receiving a valid CAN request from the VCU 108.

Figure 4A:
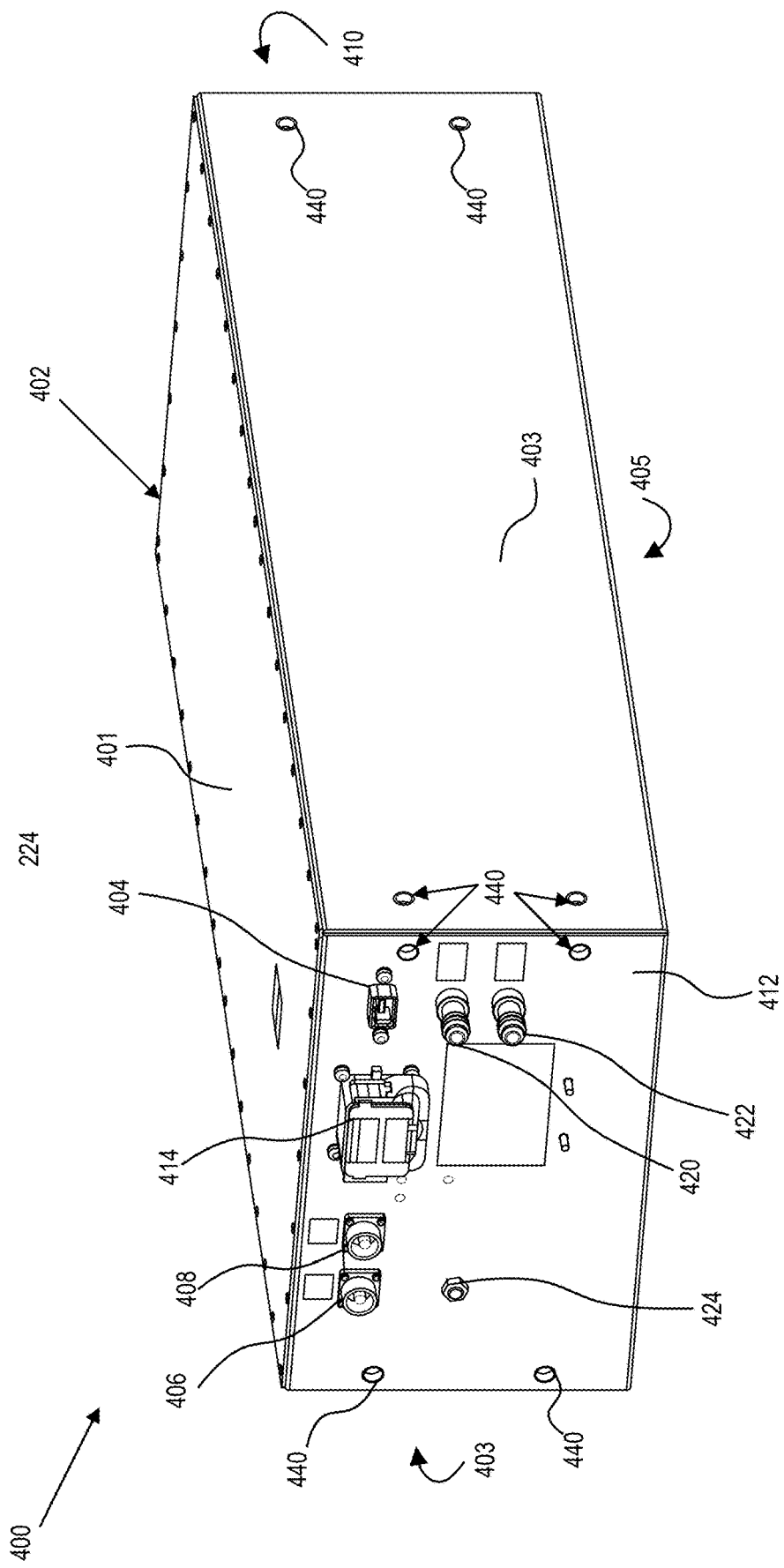
FIG. 4A sets forth a perspective view of an example battery pack for an electric marine vessel in accordance with at least one embodiment of the present disclosure.
Figure 4B:
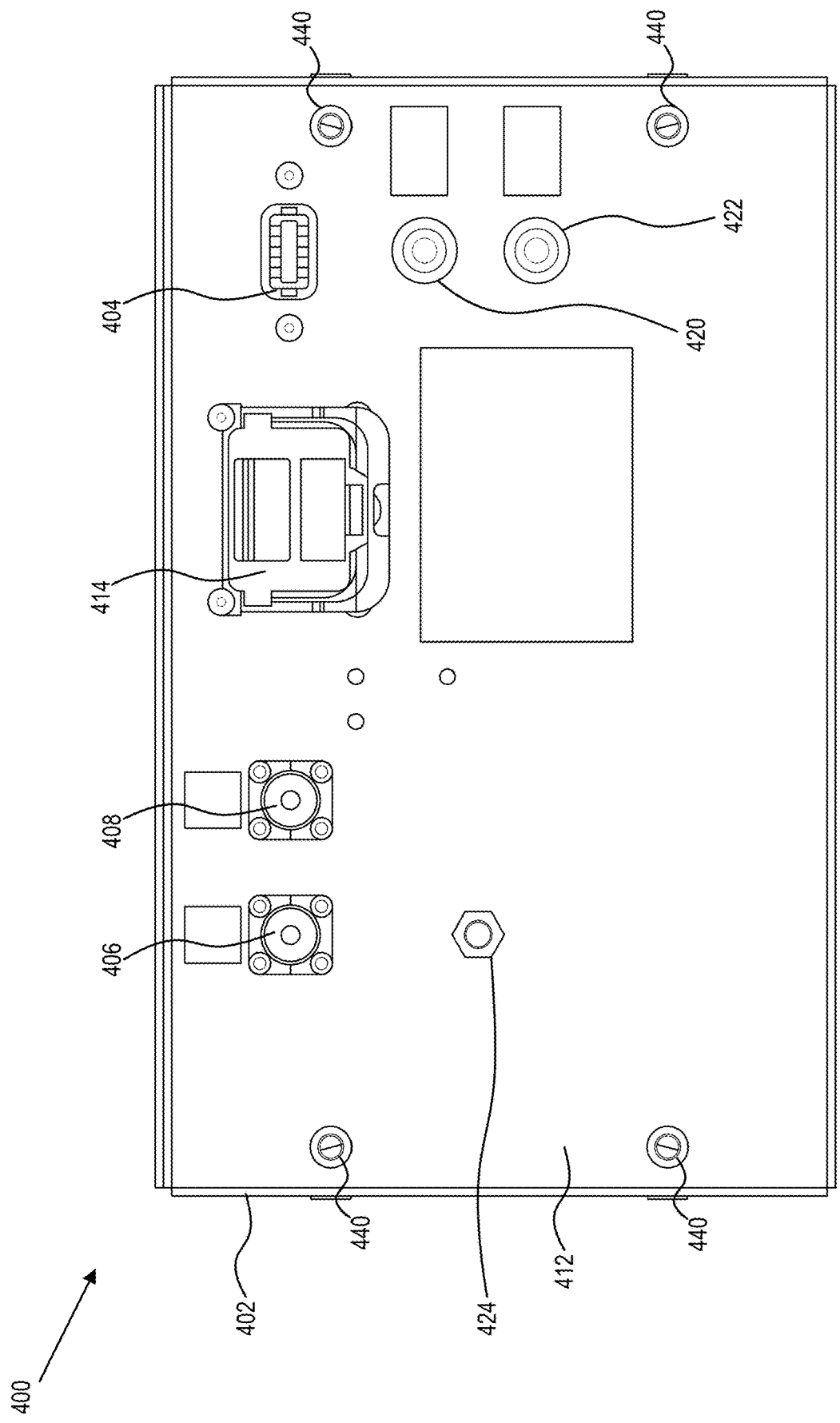
FIG. 4B sets forth a front view of the example battery pack of FIG. 4A.
Figure 4C:
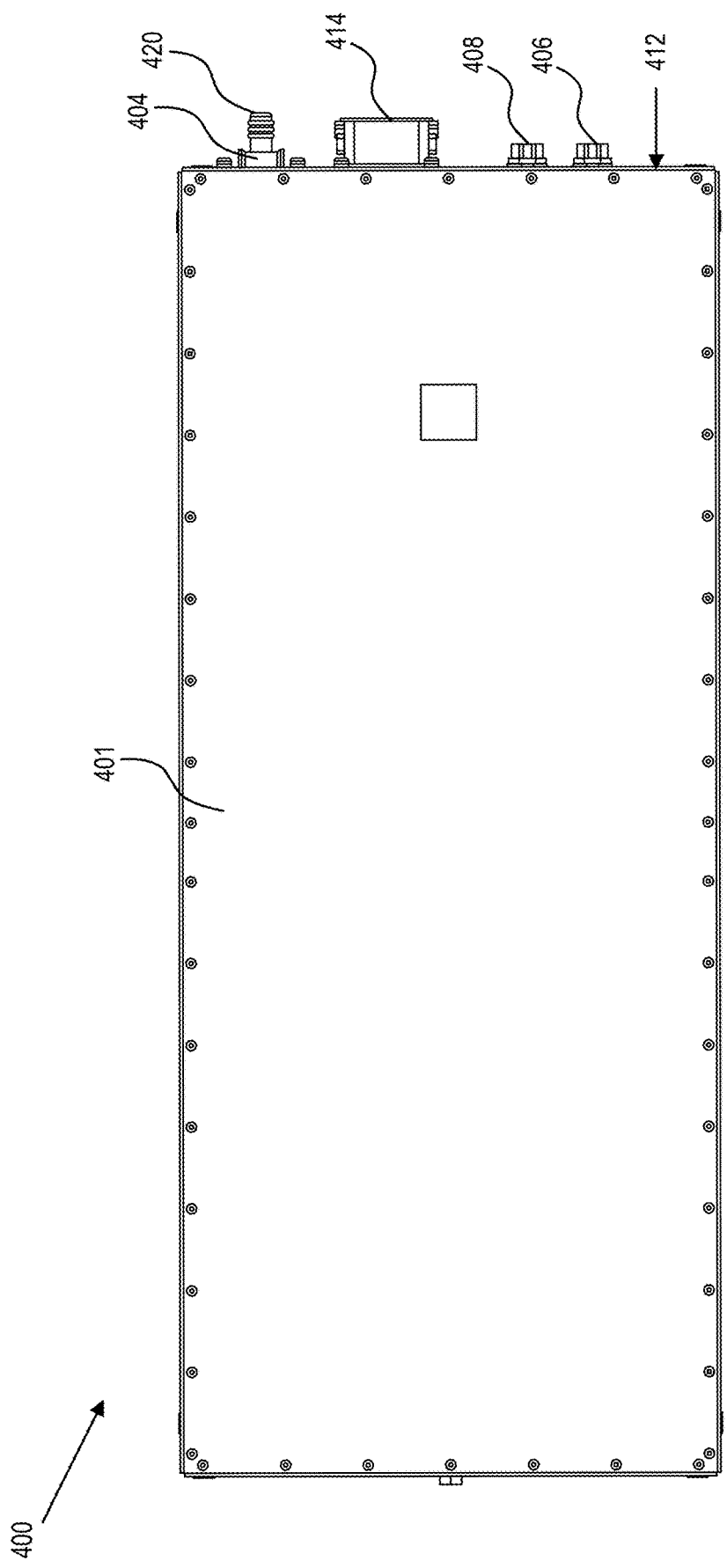
FIG. 4C sets forth a top view of the example battery pack of FIG. 4A.

For further reference FIGS. 4A, 4B, and 4C set forth a diagram of an example battery pack 400 for an electric marine vessel in accordance with at least one embodiment of the present disclosure. In some examples, the battery pack 400 includes the electronic configuration depicted in the schematic of FIG. 2. Beginning with FIG. 4A, the battery pack 400 includes a metallic chassis 402 formed of, for example, stainless steel or aluminum. For example, the chassis 402 may be the same as chassis 250 in FIG. 2. Unlike battery packs that are used in electric vehicles, which are substantially flat for placement under the vehicle cabin, the chassis 402 of the marine vessel battery pack 400 is constructed with dimensions that are smaller than a marine vessel gas tank. Thus, in some examples, marine vessel battery pack 400 is configured for placement in a cavity of the vessel's hull where a gas tank would have been located. This allows a conventional internal combustion engine (ICE) vessel to be refitted with a full-electric powertrain. In a particular example, the dimensions of the chassis may be 500 millimeters in width×300 millimeters in height×1200 millimeters in length, where the length dimension is defined in a direction from bow to stern of the vessel. The chassis 402 is characterized by a top portion 401, a bottom portion 405, sidewalls 403, a rear flange 410, and a front flange 412 that form a waterproof enclosure.

The chassis 402 is waterproof to prevent water from entering the chassis 402, which could potentially cause a fire or explosion in the battery pack 400. In some examples, the chassis 402 conforms to an ingress protection rating of IP67, in that the chassis 402 can be submerged in water one meter of water for up to thirty minutes without an ingress of water or solids. As such, should that battery pack 400 be expelled from the marine vessel into the water in the case of an accident, the battery pack 400 will not pose a risk to humans as they seek safety.

The battery pack connectors and interfaces are disposed on the front flange 412 of the chassis 402. The connectors include and the HV+ plug 406 (e.g., the HV+ plug 206 of FIG. 2), an HV− plug 408 (e.g., the HV− plug 208 of FIG. 2), a signals connector 404 (e.g., the signals connector 204 of FIG. 2), and an MSD connector 414 (e.g., the MSD connector 214 of FIG. 2). The connectors also include a coolant input port 420, a coolant output port 422, and a degassing valve 424. In some examples, the HV+ plug 206, the HV− plug 208, the signals connector 204, and the MSD connector 214 are disposed substantially in a row in an upper portion of the front flange 412 proximate to the top portion 401 of the chassis 402. In this way, the HV+ plug 206, the HV− plug 208, the signals connector 204, and the MSD connector 214 are advantageously situated for connection to other powertrain components such as the PDU 104 and the VCU 108.

The coolant input port 420 and coolant output port 422 provide for the circulation of coolant into and out of the battery pack 400. For example, the coolant input port 420 and coolant output port 422 may be coupled to coolant lines of a coolant recirculation system that includes a coolant pump and heat exchanger. In some examples, the coolant can be ethylene glycol or a similar heat transfer compound. In other examples, the coolant can be water. In these examples, ambient water from a body of water can be pumped into the battery pack 400 and returned to the body of water after heat exchange with the battery cells. The degassing valve 424 may be used to expel gas released into the battery pack 400 by a malfunction of one or more battery cells.

The chassis 402 also includes damper mounting points 440. In some examples, each vertical face (front flange, rear flange, and sidewalls) of the chassis 402 includes damper mounting points 440 that support a damper (not shown). For example, the damper may be a rubber pad with a threaded post that is received into a threaded aperture of the damper mounting point. In some examples, as shown, there are four damper mounting points 440 on each vertical face. In electric automobiles, any effect of shocks and vibrations on the HV battery is mitigated by the springs and suspensions of the vehicle, as well as the tires, which absorb such vibrations. Thus, there is no need to account for such effects when designing an HV battery for the automotive industry. In an electric marine vessel, however, the force of the vessel hitting the water or waves at high speed can cause a large shock or vibration to the HV battery. In accordance with at least one embodiment of the present disclosure, when installed in the electric marine vessel the battery pack 400 includes dampers attached at the damper mounting points 440 to protect the battery pack 400 from such shocks and vibrations. These dampers are compact and lightweight, thus obviating the need for complex or heavy spring-based shock absorbers. A variety of damper mounting point 440 locations on the vertical surfaces of the chassis 402 allows for custom placement of dampers on the chassis 402 based on the installation configuration within the hull. In some examples, the battery pack 400 is installed on a rubber mat or rubber floor (e.g., waterproof polyvinyl or ethylene-vinyl acetate (EVA) foam flooring) to mitigate shock in the Z direction.

Figure 5:
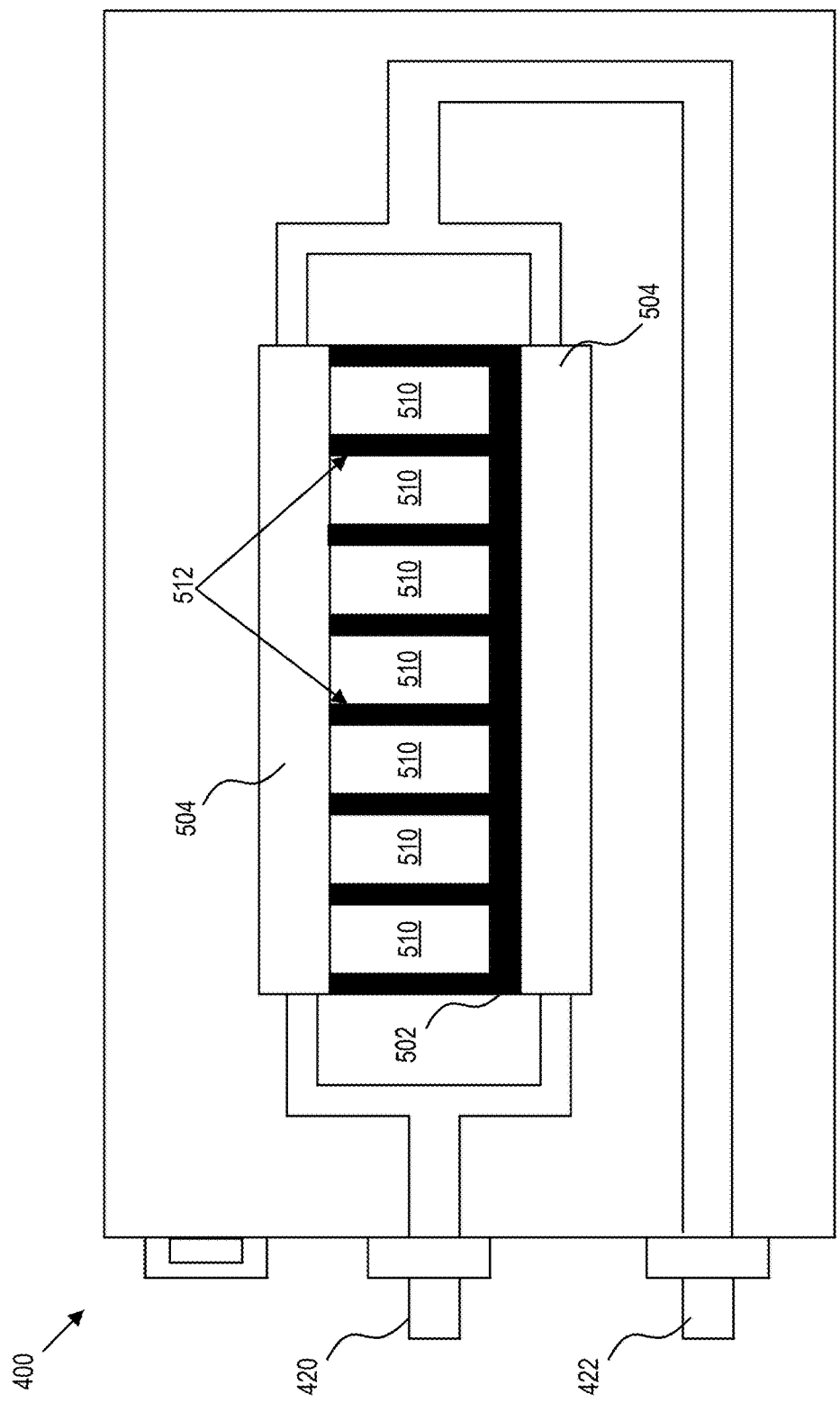
FIG. 5 sets for a block diagram of an example cooling system for a battery pack for an electric marine vessel in accordance with at least one embodiment of the present disclosure.

For further explanation, FIG. 5 sets for a diagram of an example cooling system for the battery pack 400 shown in FIGS. 4A-4C. The cross-sectional view of FIG. 5 shows a battery cell holder 502 coupled to one or more cooling plates 504. In a particular example, the battery cell holder 502 is sandwiched between two cooling plates 504, as shown. Although two cooling plates 504 are shown, it will be appreciated that a different number of cooling plates can be employed. Each cooling plate 504 includes an input valve coupled to the coolant input port 420 via a coolant line and an output valve coupled to the coolant output port 422 via a coolant line. Coolant circulates through the cooling plate 504 via one or more pipes formed within the cooling plate 504. For example, the pipe or pipes can follow a serpentine or switchback path that circulates coolant through the cooling plate 504, or multiple parallel pipes in the cooling plate 504 may circulate coolant through the cooling plate 504. In a particular example, the cooling plate 504 is constructed from aluminum.

Figure 6A:
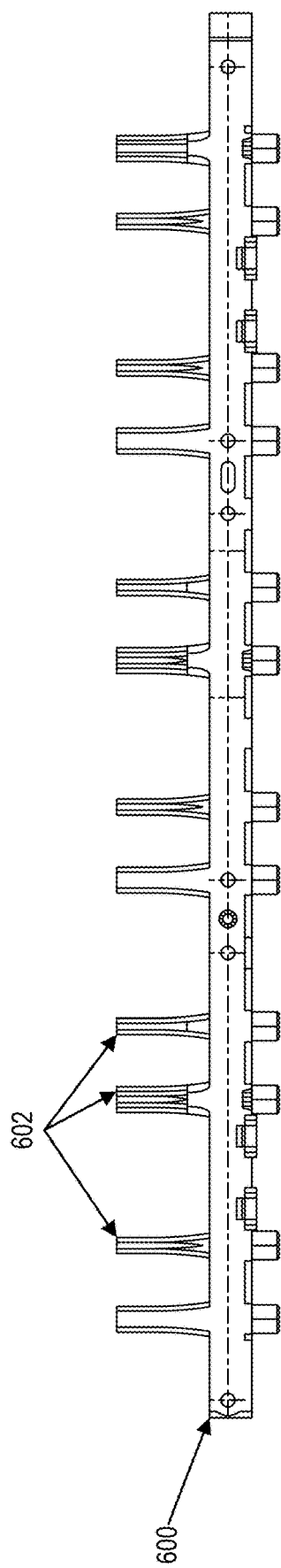
FIG. 6A is a front view of an example cell holder for a battery pack for an electric marine vessel in accordance with at least one embodiment of the present disclosure.
Figure 6B:
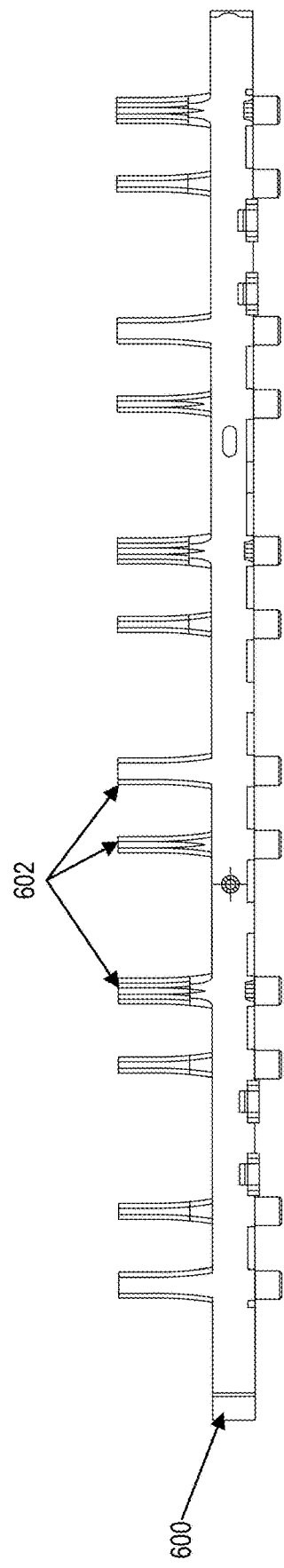
FIG. 6B is a rear view of the example cell holder of FIG. 6A.
Figure 6E:
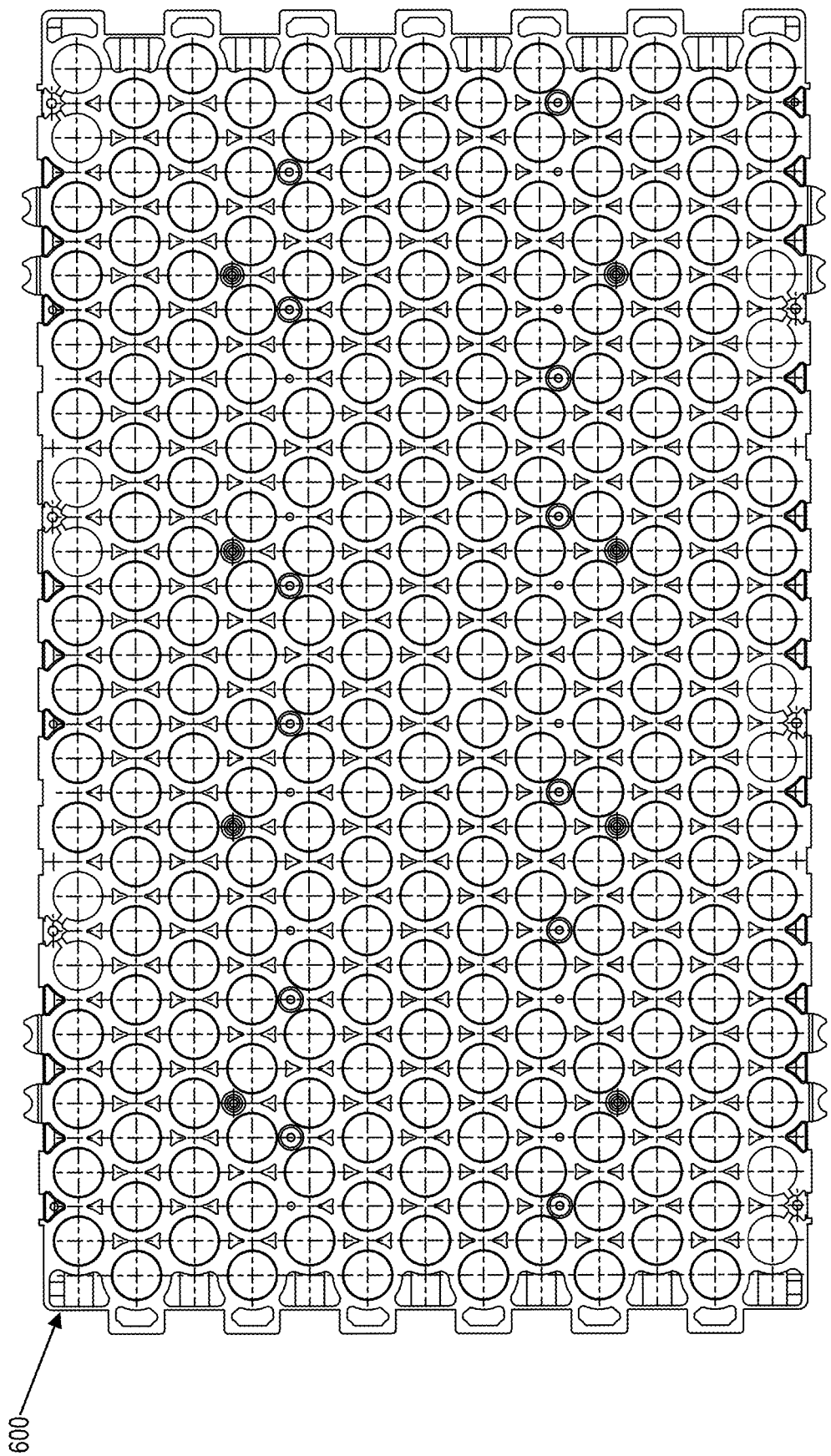
FIG. 6E is a top view of the example cell holder of FIG. 6A.
Figure 6F:
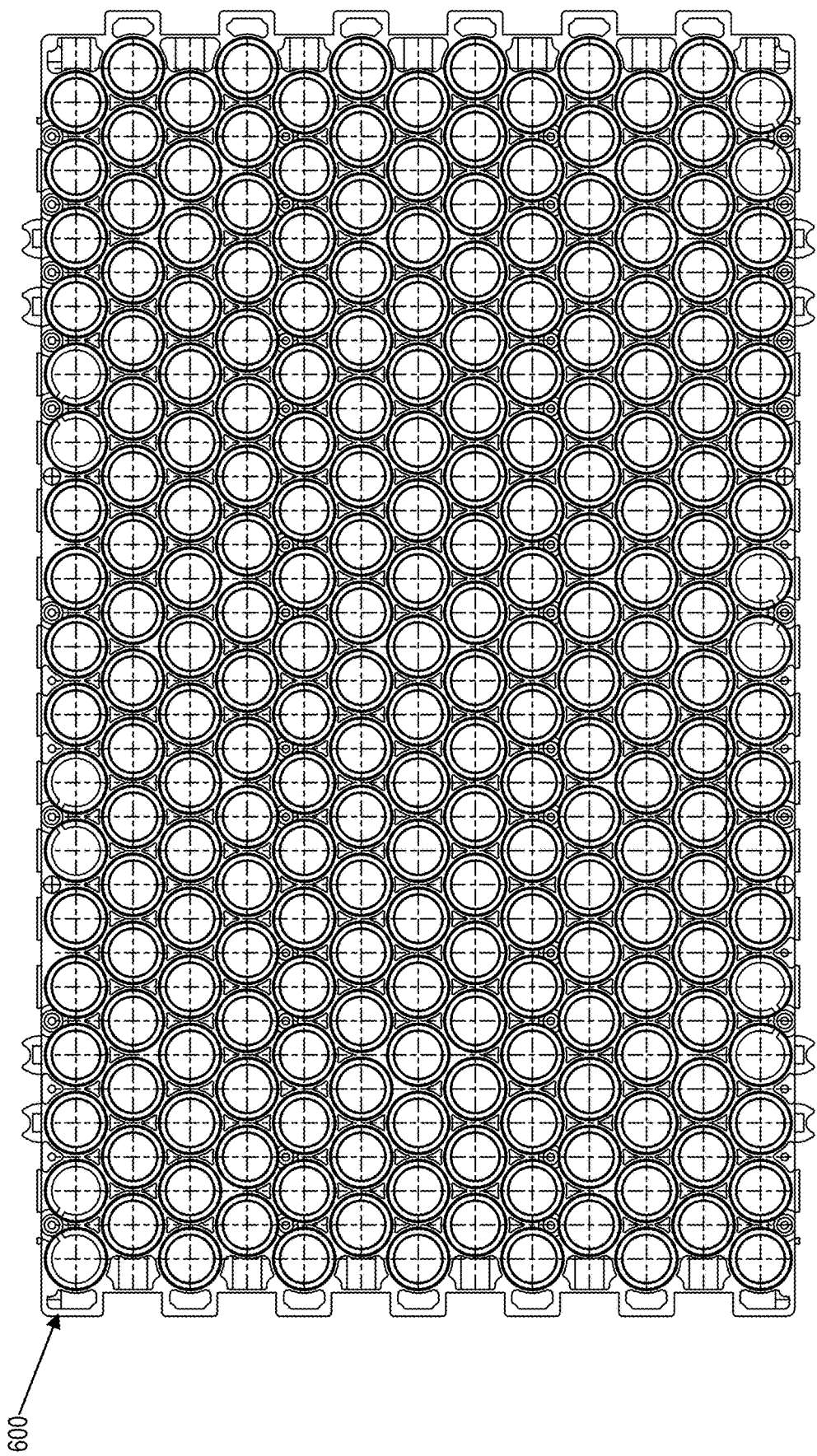
FIG. 6F is a bottom view of the example cell holder of FIG. 6A.

The battery cell holder 502 defines a position for each battery cell 510 of the battery pack 400. The battery cell holder 502 includes a number of spacers 512 that hold the battery cells 510 in place at a particular distance from one another to prevent heat transfer between the battery cells 510 or prevent a fire or overheating event from spreading from one battery cell to another. In a particular example, the spacers 512 define a honeycomb pattern for battery cell placement. For further explanation of the battery cell holder 502, FIGS. 6A-6F provide multiple views of a diagram of an example battery cell holder 600 in accordance with at least one embodiment of the present disclosure. The battery cell holder 600 includes spacers 602 that hold the battery cells in place at a particular distance from one another in a honeycomb pattern. FIG. 6A is a front view of the example cell holder 600. FIG. 6B is a rear view of the example cell holder 600 of FIG. 6A. FIG. 6C is a side view of the example cell holder 600 of FIG. 6A. FIG. 6D is an opposite side view of the example cell holder 600 of FIG. 6C. FIG. 6E is a top view of the example cell holder 600 of FIG. 6A. FIG. 6F is a bottom view of the example cell holder 600 of FIG. 6A.

For further explanation, FIG. 7 sets forth a flow chart of an example method for a battery pack for an electric marine vessel. The method of FIG. 7 includes providing 702 a battery pack. In some examples, the battery pack is implemented in accordance with the HV battery 103 of FIGS. 1A and 1C, the battery pack 200 of FIG. 2, and/or the battery pack 400 of FIGS. 4A-4C. The battery pack includes a chassis including a top panel, a bottom panel, a first sidewall extending along a length of the top panel and the bottom panel, a front flange extending along a width of the top panel and the bottom panel, and a rear flange extending along a width of the top panel and the bottom panel, wherein the top panel, bottom panel, first sidewall, second sidewall, front flange, and rear flange form a waterproof enclosure. For example, the battery pack can be constructed as shown in FIGS. 4A-4C. The battery pack also includes a high voltage battery comprising a plurality of battery cells disposed within the chassis. For example, the high voltage battery can be the battery device 230 shown in FIG. 2. The battery pack also includes a positive high voltage connector disposed on the front flange of the chassis, the positive high voltage connector being electrically coupled to a positive terminal of the high voltage battery. For example, the positive high voltage connector can be the HV+ plug 206, 406 shown in FIGS. 2 and 4A-4C. The battery pack also includes a negative high voltage connector disposed on the front flange of the chassis, the negative high voltage connector being electrically coupled to a negative terminal of the high voltage battery. For example, the negative high voltage connector can be the HV- plug 208, 408 shown in FIGS. 2 and 4A-4C. The battery pack also includes a manual disconnect connector disposed on the front flange of the chassis. For example, the manual disconnector connector can be the MSD connector 214 shown in FIGS. 2 and 4A-4C. The battery pack also includes a signals connector disposed on the front flange of the chassis, the signals connector configured for signal communication with at least a power distribution unit and a vessel control unit. For example, the signals connector can be the signals connector 204 shown in FIGS. 2 and 4A-4C. The battery pack also includes a battery management system disposed within the chassis and coupled to the signals connector, the battery management system comprising: a battery management controller; a plurality of relays operable by the battery management controller; and a plurality of sensors electrically coupled to the battery management controller. For example, the battery management controller can be the BMC 202 shown in FIG. 2. The plurality of relays can include one or more of the relays 216, 218, 228 shown in FIG. 2 and the relays 302, 304 shown in FIG. 3. The plurality of sensors can include the CMCs 212, current sensor 226, and the IMC 210.

The method of FIG. 7 also includes coupling 704 the positive high voltage connector and the negative high voltage connector of the battery pack to a power distribution unit the electric marine vessel. In some examples, the positive high voltage connector and the negative high voltage connector of the battery pack are couple 704 to the power distribution unit (e.g., the PDU 104 of FIGS. 1A and 1D) via high voltage electrical cables.

The method of FIG. 7 also includes coupling 706 an HVIL circuit of the battery pack to an HVIL circuit of the power distribution unit via the signals connector. In some implementations, the power distribution unit includes one or more HVIL relays or contactors and the battery pack includes one or more relays or contactors. In some examples, coupling 706 an HVIL circuit of the battery pack to an HVIL circuit of the power distribution unit via the signals connector includes electrically coupling an HVIL OUT of the battery pack signal connector to an HVIL IN of a power distribution unit signal connector and coupling an HVIL IN of the battery pack signal connector to an HVIL out of the power distribution unit signal connector by mating an external connector with the battery back signal connector.

The method of FIG. 7 also includes coupling 708 the battery pack to a vessel control area network (CAN) bus via the signals connector, the vessel CAN bus providing communication with a vessel control unit. In some examples, coupling 708 the battery pack to a vessel control area network (CAN) bus via the signals connector includes electrically coupling one or more CAN bus signals of the battery pack signal connector to one or more CAN bus signals of the vessel control unit by mating an external connector with the battery back signal connector.

Figure 8:
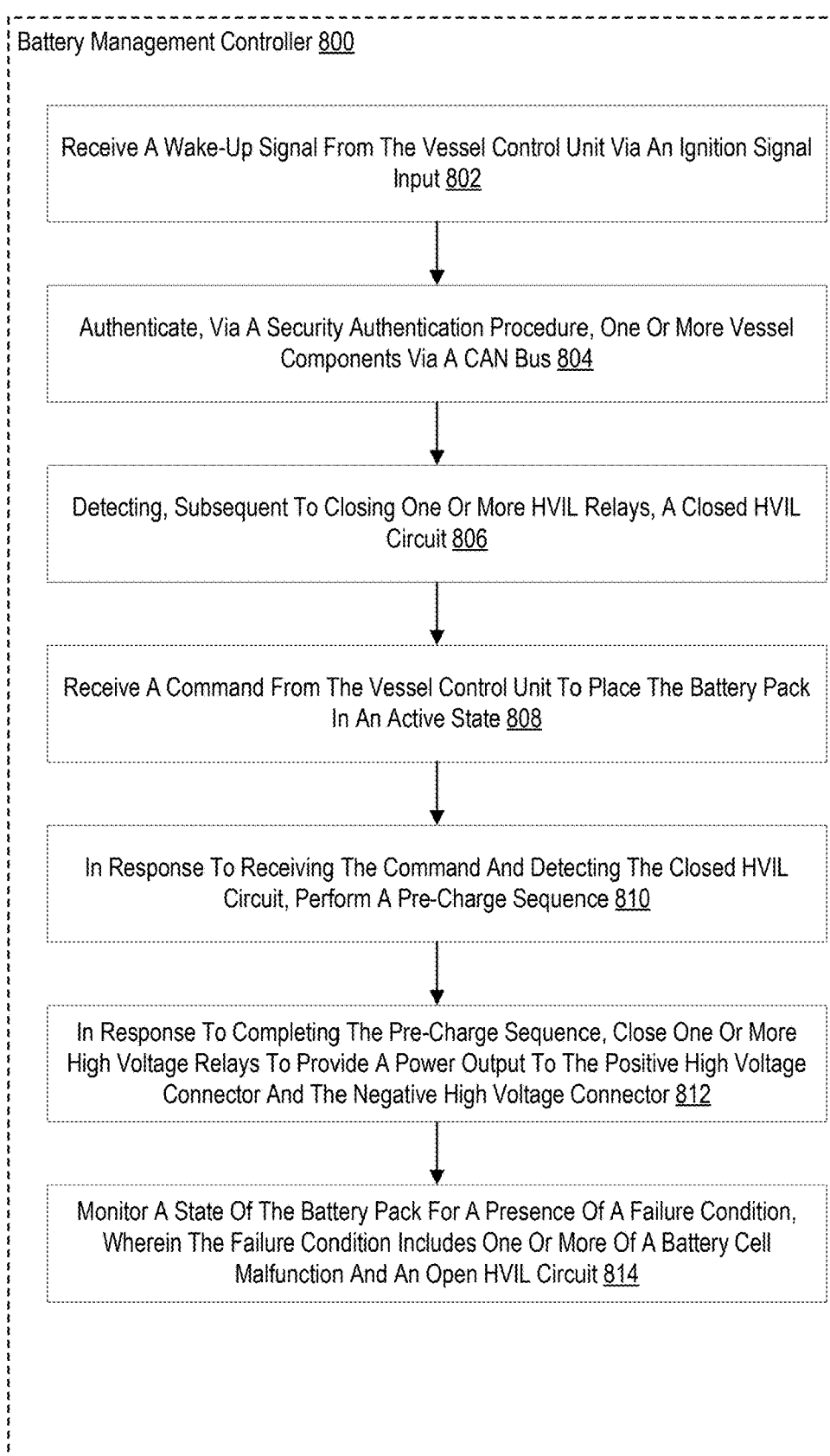
FIG. 8 sets forth a flow chart of an example method for a battery pack for an electric marine vessel in accordance with at least one embodiment of the present disclosure.

For further explanation, FIG. 8 sets forth a flow chart of an example method of a battery management system of a battery pack for an electric marine vessel. The example method of FIG. 8 includes a battery management controller (BMC) 800. The BMC 800 can be implemented as an ASIC, a microcontroller, a programmable logic device, a processor executing instructions stored in a memory device, or other circuitry configurable to implement the functionality of the BMC 800 described herein. The BMC 800 may be similar to or the same as controller 132 of FIG. 1C and/or the BMC 202 of FIG. 2. The method of FIG. 8 includes receiving 802 a wake-up signal from a vessel control unit via an ignition signal input. In some examples, the vessel control unit provides a 12V input over the IGNITION signal line to wake up the BMC 800 of the battery management system. Upon waking up, the BMC 800 places the battery pack in an IDLE state.

The method of FIG. 8 also includes authenticating 804, via a security authentication procedure, one or more vessel components via a CAN bus. In some examples, the BMC 800 receives an authentication packet from at least the vessel control unit (e.g., the VCU 108). The BMC 800 performs an authentication procedure to verify the authenticity of the vessel control unit before receiving and acting upon commands received from the vessel control unit. The BMC also transmits its own authentication packet to the vessel control unit in order to authenticate itself to the vessel control unit.

The method of FIG. 8 also includes detecting 806, subsequent to closing one or more HVIL relays, a closed HVIL circuit. In some examples, the BMC 800 closes the HVIL relays of the battery pack in order to close the HVIL circuit shared with the power distribution unit. The HVIL circuit is closed if the power distribution also closes its relays. The BMC 800 will then detect that the HVIL status is 'closed' and thus determine that there is no failure state.

The method of FIG. 8 also includes receiving 808 a command from a vessel control unit to place the battery pack in an active state. In some examples, the BMC 800 receives an ACTIVATE command from the vessel control unit via the CAN bus.

The method of FIG. 8 also includes, in response to receiving the command and detecting the closed HVIL circuit, performing 810 a pre-charge sequence. In some examples, once the BMC 800 determines that the HVIL status is 'closed' and the ACTIVATE command has been received from the vessel control unit, the BMC 800 places the battery pack in the ACTIVE state and performs a pre-charge sequence by closing a pre-charge relay to pre-charge the load on the battery pack (i.e., the inverter of the marine propulsion device).

The method of FIG. 8 also includes in response to completing the pre-charge sequence, closing 812 one or more high voltage relays to provide a power output to the positive high voltage connector and the negative high voltage connector. In some examples, once the BMC 800 completes the pre-charge sequence, the BMC 800 closes the relays on the positive and negative connection between the high voltage connectors and the battery terminals.

The method of FIG. 8 also includes monitoring 814 a state of the battery pack for a presence of a failure condition, wherein the failure condition includes one or more of a battery cell malfunction and an open HVIL circuit. In some examples, the BMC 800 monitors the HVIL circuit to determine that the HVIL status is 'closed.' If the BMC 800 ever detects that the HVIL status is 'open,' indicating that a physical break in the signal or that the power distribution unit has opened its HVIL relays or that the battery pack HVIL connection of the BMC 800 to the HV+ plug or HV− plug is interrupted. If the HVIL status is 'open,' the BMC 800 opens the high voltage relays in the battery pack and places the battery pack in a FAILURE state. In some examples, the BMC 800 monitors the voltage and temperature of the battery cells, as well as the output voltage of the battery and the load voltage on the battery, as well as the load current. If the BMC detects a malfunction in the battery (e.g., a thermal runaway event), the BMC 800 opens the high voltage relays in the battery pack and places the battery pack in a FAILURE state. It will be appreciated that other failure condition can be detected, and embodiments of the present disclosure are not limited to only the failure conditions identified above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A battery pack for an electric marine vessel, the battery pack comprising:
   a chassis including a top panel, a bottom panel, a first sidewall and a second sidewall that each extend along a length of the top panel and the bottom panel, a front flange and a rear flange that each extend along a width of the top panel and the bottom panel, wherein the top panel, the bottom panel, the first sidewall, the second sidewall, the front flange, and the rear flange together form a waterproof enclosure;
   a high voltage battery comprising a plurality of battery cells disposed within the chassis;
   a positive high voltage connector disposed on the front flange of the chassis, the positive high voltage connector being electrically coupled to a positive terminal of the high voltage battery;
   a negative high voltage connector disposed on the front flange of the chassis, the negative high voltage connector being electrically coupled to a negative terminal of the high voltage battery;
   a manual disconnect connector disposed on the front flange of the chassis;
   a signals connector disposed on the front flange of the chassis, the signals connector configured for signal communication with at least a power distribution unit and a vessel control unit; and
   a battery management system disposed within the chassis and coupled to the signals connector, the battery management system comprising:
   a battery management controller;
   a plurality of relays operable by the battery management controller; and
   a plurality of sensors electrically coupled to the battery management controller;
   wherein the battery management controller is configured to:
   receive a wake-up signal from the vessel control unit via an ignition signal input;
   authenticate, via a security authentication procedure, one or more vessel components via a CAN bus;
   detecting, subsequent to closing one or more HVIL relays, a closed HVIL circuit;
   receive a command from the vessel control unit to place the battery pack in an active state;
   in response to receiving the command and detecting the closed HVIL circuit, perform a pre-charge sequence; and
   in response to completing the pre-charge sequence, close one or more high voltage relays to provide a power output to the positive high voltage connector and the negative high voltage connector.

2. The battery pack of claim 1, wherein the positive high voltage connector, the negative high voltage connector, the manual disconnect connector, and the signals connector are disposed within a top portion of the front flange.

3. The battery pack of claim 1, wherein the chassis conforms to an ingress protection rating of at least IP67.

4. The battery pack of claim 1, wherein a form factor of the battery pack permits placement of the battery pack in a cavity of a vessel hull, wherein the cavity is configured to receive a gas tank.

5. The battery pack of claim 1 further comprising:
   a battery cell cooling structure disposed within the chassis and configured and thermally coupled to the plurality of battery cells;
   a coolant input port disposed on the front flange of the chassis; and
   a coolant output port disposed on the front flange of the chassis, wherein the coolant input port and coolant output port transport coolant to and from the cooling structure.

6. The battery pack of claim 5 further comprising a cell holder disposed within the chassis and configured to receive the plurality of battery cells, wherein the cell holder is configured to maintain a minimum distance between each battery cell, and wherein the cell holder is thermally coupled to the cooling structure.

7. The battery pack of claim 1, wherein the battery management controller is configured to send and/or receive a plurality of signals via the signals connector, the plurality of signals including at least a vessel control area network (CAN) bus signal, a high voltage interlock loop (HVIL) signal, a low voltage power input, an ignition signal, and a ground reference.

8. The battery pack of claim 1, wherein the signals connector includes a plurality of leads respectively corresponding to one or more vessel CAN bus signals, a low voltage power input, a ground reference, an HVIL input, an HVIL output, one or more identification signals, and one or more diagnostic signals.

9. The battery pack of claim 1, wherein the battery management controller controls one or more high voltage relays, one or more HVIL relays, and a pre-charge circuit relay.

10. The battery pack of claim 1, wherein the battery management controller is configured to:
monitor a state of the battery pack for a presence of a failure condition, wherein the failure condition includes one or more of a battery cell malfunction and an open HVIL circuit.

11. An electric marine vessel comprising:
a vessel control unit;
a power distribution unit communicatively coupled to the vessel control unit;
a marine propulsion device electrically coupled to the power distribution unit; and
at least one battery pack electrically coupled to the power distribution unit, the at least one battery pack comprising:
a chassis including a top panel, a bottom panel, a first sidewall and a second sidewall that each extend along a length of the top panel and the bottom panel, a front flange and a rear flange that each extend along a width of the top panel and the bottom panel, wherein the top panel, the bottom panel, the first sidewall, the second sidewall, the front flange, and the rear flange together form a waterproof enclosure;
a high voltage battery comprising a plurality of battery cells disposed within the chassis;
a positive high voltage connector disposed on the front flange of the chassis, the positive high voltage connector being electrically coupled to a positive terminal of the high voltage battery;
a negative high voltage connector disposed on the front flange of the chassis, the negative high voltage connector being electrically coupled to a negative terminal of the high voltage battery;
a manual disconnect connector disposed on the front flange of the chassis;
a signals connector disposed on the front flange of the chassis, the signals connector configured for signal communication with at least the power distribution unit and the vessel control unit; and
a battery management system disposed within the chassis and coupled to the signals connector, the battery management system comprising:
a battery management controller;
a plurality of relays operable by the battery management controller; and
a plurality of sensors electrically coupled to the battery management controller;
wherein the battery management controller is configured to:
receive a wake-up signal from the vessel control unit via an ignition signal input;
authenticate, via a security authentication procedure, one or more vessel components via a CAN bus;
detecting, subsequent to closing one or more HVIL relays, a closed HVIL circuit;
receive a command from the vessel control unit to place the battery pack in an active state;
in response to receiving the command and detecting the closed HVIL circuit, perform a pre-charge sequence; and
in response to completing the pre-charge sequence, close one or more high voltage relays to provide a power output to the positive high voltage connector and the negative high voltage connector.

12. The electric marine vessel of claim 11, wherein the positive high voltage connector, the negative high voltage connector, the manual disconnect connector, and the signals connector are disposed within a top portion of the front flange.

13. The electric marine vessel of claim 11, wherein the chassis conforms to an ingress protection rating of at least IP67.

14. The electric marine vessel of claim 11, wherein a form factor of the battery pack permits placement of the battery pack in a cavity of a vessel hull, wherein the cavity is configured to receive a gas tank.

15. The electric marine vessel of claim 11 further comprising:
a battery cell cooling structure disposed within the chassis and configured and thermally coupled to the plurality of battery cells;
a coolant input port disposed on the front flange of the chassis; and
a coolant output port disposed on the front flange of the chassis, wherein the coolant input port and coolant output port transport coolant to and from the cooling structure.

16. The electric marine vessel of claim 15 further comprising a cell holder disposed within the chassis and configured to receive the plurality of battery cells, wherein the cell holder is configured to maintain a minimum distance between each battery cell, and wherein the cell holder is thermally coupled to the cooling structure.

17. The electric marine vessel of claim 11, wherein the battery management controller is configured to send and/or receive a plurality of signals via the signals connector, the plurality of signals including at least a vessel control area network (CAN) bus signal shared with the vessel control unit, a high voltage interlock loop (HVIL) signal shared with the power distribution unit, a low voltage power input, an ignition signal, and a ground reference.

18. The electric marine vessel of claim 11, wherein the signals connector includes a plurality of leads respectively corresponding to one or more vessel CAN bus signals, a low voltage power input, a ground reference, an HVIL input, an HVIL output, one or more identification signals, and one or more diagnostic signals.

19. The electric marine vessel of claim 11, wherein the battery management controller is configured to:
monitor a state of the battery pack for a presence of a failure condition, wherein the failure condition includes one or more of a battery cell malfunction and an open HVIL circuit.

20. A method of using a high voltage battery pack for an electric marine vessel, the method comprising:
providing a battery pack comprising:
a chassis including a top panel, a bottom panel, a first sidewall and a second sidewall that each extend along a length of the top panel and the bottom panel, a front flange and a rear flange that each extend along a width of the top panel and the bottom panel, wherein the top panel, the bottom panel, the first sidewall, the second sidewall, the front flange, and the rear flange together form a waterproof enclosure;
a positive high voltage connector disposed on the front flange of the chassis, the positive high voltage connector being electrically coupled to a positive terminal of a high voltage battery;

a negative high voltage connector disposed on the front flange of the chassis, the negative high voltage connector being electrically coupled to a negative terminal of the high voltage battery;

a manual disconnect connector disposed on the front flange of the chassis;

a signals connector disposed on the front flange of the chassis, the signals connector configured for signal communication with at least a power distribution unit and a vessel control unit; and a battery management system disposed within the chassis and coupled to the signals connector, the battery management system comprising:
 a battery management controller;
 a plurality of relays operable by the battery management controller; and
 a plurality of sensors electrically coupled to the battery management controller;

coupling the positive high voltage connector and the negative high voltage connector of the battery pack to a power distribution unit of the electric marine vessel;

coupling an HVIL circuit of the battery pack to an HVIL circuit of the power distribution unit via the signals connector; and coupling the battery pack to a vessel control area network (CAN) bus via the signals connector, the vessel CAN bus providing communication with the vessel control unit;

wherein the battery management controller is configured to:

receive a wake-up signal from the vessel control unit via an ignition signal input;

authenticate, via a security authentication procedure, one or more vessel components via a CAN bus;

detecting, subsequent to closing one or more HVIL relays, a closed HVIL circuit;

receive a command from the vessel control unit to place the battery pack in an active state;

in response to receiving the command and detecting the closed HVIL circuit, perform a pre-charge sequence; and in response to completing the pre-charge sequence, close one or more high voltage relays to provide a power output to the positive high voltage connector and the negative high voltage connector.

* * * * *